US012070941B2

(12) United States Patent
Kondo

(10) Patent No.: US 12,070,941 B2
(45) Date of Patent: Aug. 27, 2024

(54) LIQUID DISCHARGE DEVICE

(71) Applicant: SEIKO EPSON CORPORATION, Tokyo (JP)

(72) Inventor: Yoichiro Kondo, Chino (JP)

(73) Assignee: SEIKO EPSON CORPORATION (JP)

( * ) Notice: Subject to any disclaimer, the term of this patent is extended or adjusted under 35 U.S.C. 154(b) by 144 days.

(21) Appl. No.: 17/892,409

(22) Filed: Aug. 22, 2022

(65) Prior Publication Data

US 2023/0055010 A1 Feb. 23, 2023

(30) Foreign Application Priority Data

Aug. 23, 2021 (JP) ................................ 2021-135395

(51) Int. Cl.
*B41J 2/045* (2006.01)
*B41J 2/14* (2006.01)

(52) U.S. Cl.
CPC ....... *B41J 2/04541* (2013.01); *B41J 2/04581* (2013.01); *B41J 2/14* (2013.01); *B41J 2002/14491* (2013.01)

(58) Field of Classification Search
CPC ...... B41J 2/04541; B41J 2/04581; B41J 2/14; B41J 2002/14491; B41J 2002/14362; B41J 2002/14419; B41J 2/04588; B41J 2/04596; B41J 2/04593; B41J 2/14233
See application file for complete search history.

(56) References Cited

U.S. PATENT DOCUMENTS

2018/0370228 A1 12/2018 Tamura

FOREIGN PATENT DOCUMENTS

JP 2019-005961 A 1/2019

*Primary Examiner* — Lisa Solomon
(74) *Attorney, Agent, or Firm* — Harness, Dickey & Pierce, P.L.C.

(57) ABSTRACT

A liquid discharge device including a discharge head, a head drive circuit that outputs a first drive signal, and a second drive signal, and a coupling member includes a first wiring that propagates the first drive signal, a second wiring that propagates the second drive signal, a third wiring that propagates a reference voltage signal, and a base material provided with the first wiring, the second wiring, and the third wiring, in which the first wiring and the second wiring are provided on a first surface of the base material, the third wiring is provided on a second surface different from the first surface of the base material, and at least one of the first wiring and the second wiring is located so as to overlap with at least a part of the third wiring in a first direction along a direction from the first surface to the second surface.

8 Claims, 19 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

LIQUID DISCHARGE DEVICE

The present application is based on, and claims priority from JP Application Serial Number 2021-135395, filed Aug. 23, 2021, the disclosure of which is hereby incorporated by reference herein in its entirety.

BACKGROUND

1. Technical Field

The present disclosure relates to a liquid discharge device.

2. Related Art

As a liquid discharge device for discharging a liquid, for example, a device using a piezoelectric element such as a piezo element is known. In such a liquid discharge device, a drive signal is supplied to the piezoelectric element to drive the piezoelectric element and discharge an amount of liquid corresponding to the drive of the piezoelectric element.

For example, JP-A-2019-005961 discloses a technique for reducing the possibility that an overshoot voltage is superimposed on a drive signal due to mutual induction by devising the arrangement of the wiring through which the drive signal in a flexible flat cable that propagates the drive signal supplied to the piezoelectric element is propagated, in a large format printer, which is one of the liquid discharge devices that discharges liquid by driving the piezoelectric element.

In response to the recent market demand for higher ink discharge rates, in the liquid discharge device, in addition to shortening a cycle of a drive waveform included in the drive signal that drives the piezoelectric element, from the viewpoint of realizing dot formation of a sufficient size even with a drive waveform having a short cycle, the amount of ink discharged by one drive waveform increases. That is, the number of drive waveforms included in the drive signal per unit time increases, and the voltage change of the drive waveform increases. As a result, a peak current generated by the propagation of the drive signal increases, and the possibility that the overshoot voltage is superimposed on the drive signal due to mutual induction is further increased. In response to such a problem, when the technique described in JP-A-2019-005961 is applied, the number of wirings included in the cable increases, and it is difficult to reduce the size of the liquid discharge device. That is, the technique described in JP-A-2019-005961 is not sufficient in response to the recent market demand for further increasing the ink discharge rate for the liquid discharge device, and there is room for improvement.

SUMMARY

According to an aspect of the present disclosure, there is provided a liquid discharge device including a discharge head that discharges liquid in response to a drive of a drive element, a head drive circuit that outputs a first drive signal driving the drive element so that the liquid is discharged, and a second drive signal driving the drive element so that the liquid is not discharged, and a coupling member whose one end is electrically coupled to the head drive circuit and the other end is electrically coupled to the discharge head, in which the coupling member includes a first wiring that propagates the first drive signal, a second wiring that propagates the second drive signal, a third wiring that propagates a reference voltage signal serving as a reference potential for driving the drive element, and a base material provided with the first wiring, the second wiring, and the third wiring, the first wiring and the second wiring are provided on a first surface of the base material, the third wiring is provided on a second surface different from the first surface of the base material, and at least one of the first wiring and the second wiring is located so as to overlap with at least a part of the third wiring in a first direction along a direction from the first surface to the second surface.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

1. First Embodiment

1.1 Configuration of Liquid Discharge Device

Figure 1:
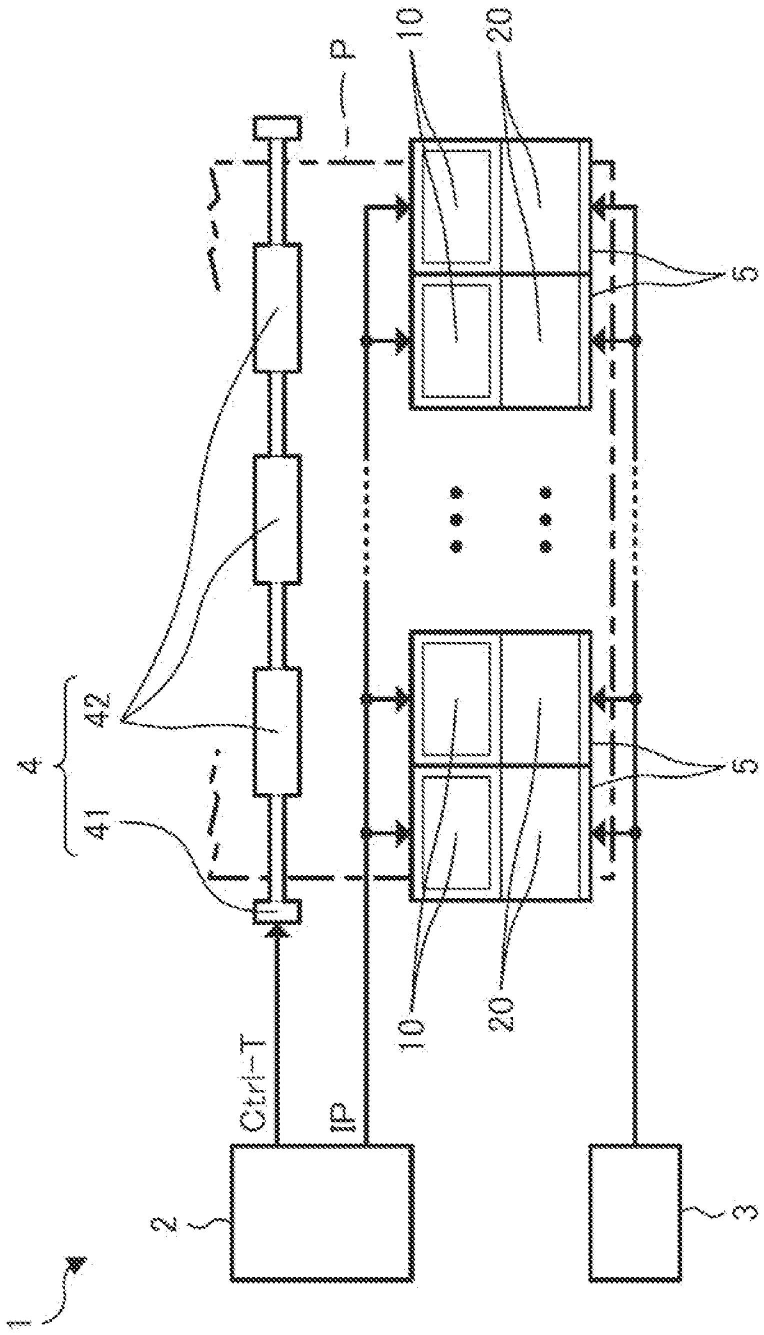
FIG. 1 is a diagram illustrating a schematic configuration of the liquid discharge device.

FIG. 1 is a diagram illustrating a schematic configuration of a liquid discharge device 1. As illustrated in FIG. 1, the liquid discharge device 1 is a so-called line-type ink jet printer that forms a desired image on a medium P by discharging ink, which is an example of a liquid, at a desired timing on the medium P transported by a transport unit 4. Here, in the following description, a direction where the medium P is transported may be referred to as a transport direction, and a width direction of the transported medium P may be referred to as a main scanning direction.

As illustrated in FIG. 1, the liquid discharge device 1 is provided with a control unit 2, a liquid container 3, a transport unit 4, and a plurality of discharge units 5.

The control unit 2 includes a processing circuit such as a central processing unit (CPU) and a field programmable gate array (FPGA), and a storage circuit such as a semiconductor memory. The control unit 2 outputs a signal for controlling each element of the liquid discharge device 1 based on image data supplied from an external device such as a host computer (not illustrated) provided outside the liquid discharge device 1.

The ink supplied to the discharge unit 5 is stored in the liquid container 3. Specifically, the liquid container 3 stores inks of a plurality of colors discharged on the medium P, such as black, cyan, magenta, yellow, red, and gray.

The transport unit 4 includes a transport motor 41 and a transport roller 42. A transport control signal Ctrl-T output by the control unit 2 is input to the transport unit 4. The transport motor 41 operates based on the input transport control signal Ctrl-T, and the transport roller 42 is rotationally driven along with the operation of the transport motor 41, so that the medium P is transported along the transport direction.

Each of the plurality of discharge units 5 includes a head drive module 10 and a liquid discharge module 20. An image information signal IP output by the control unit 2 is input to the discharge unit 5, and the ink stored in the liquid container 3 is supplied. The head drive module 10 controls the operation of the liquid discharge module 20 based on the image information signal IP input from the control unit 2, and the liquid discharge module 20 discharges the ink supplied from the liquid container 3 on the medium P according to the control of the head drive module 10.

In addition, the liquid discharge modules 20 included in each of the plurality of discharge units 5 are located side by side along the main scanning direction so as to be equal to or wider than the width of the medium P so that ink can be discharged to the entire region in the width direction of the transported medium P. As a result, the liquid discharge device 1 constitutes a line-type ink jet printer. The liquid discharge device 1 is not limited to the line-type ink jet printer.

Figure 2A:
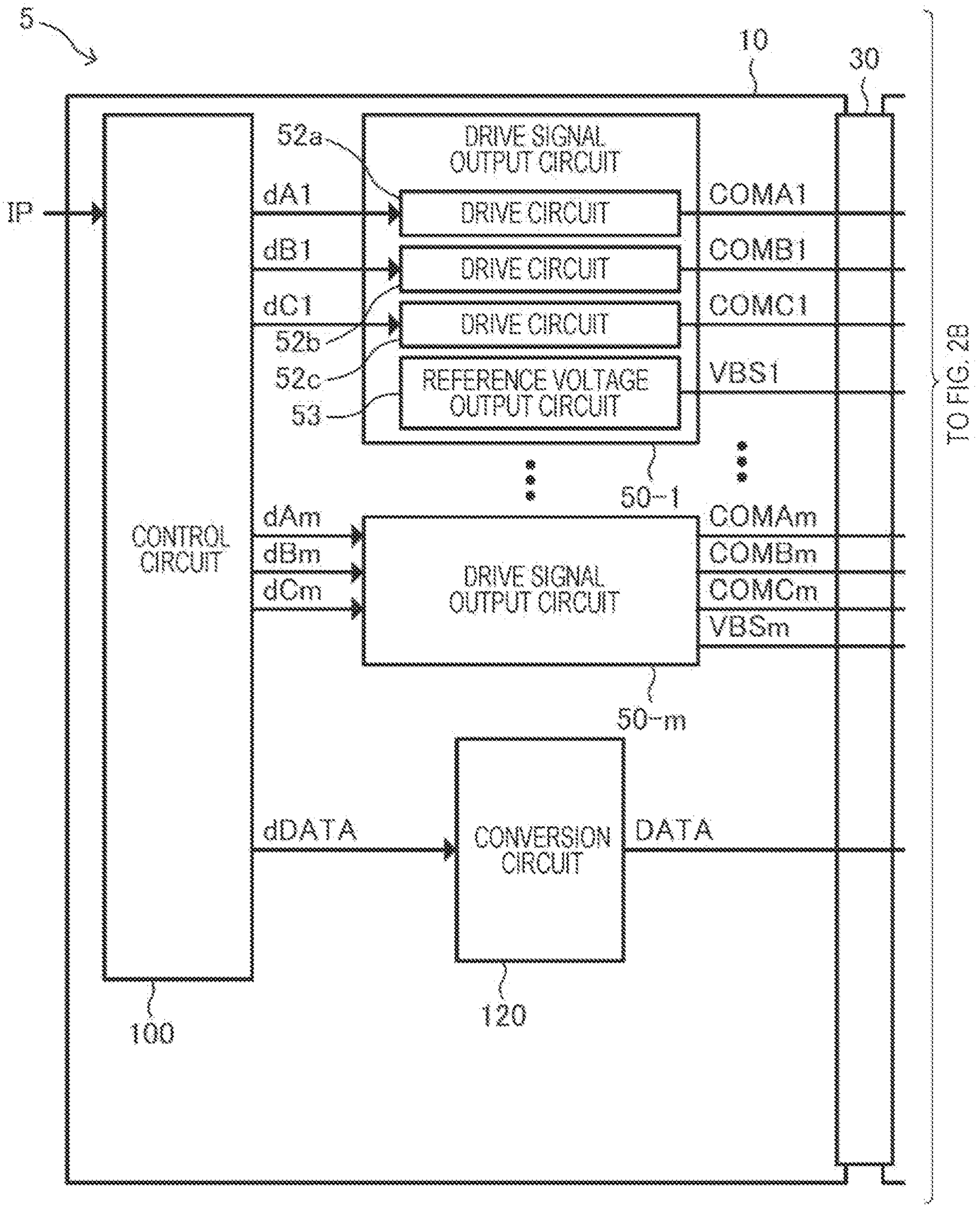
FIGS. 2A and 2B are diagrams illustrating a schematic configuration of a discharge unit.
Figure 2B:
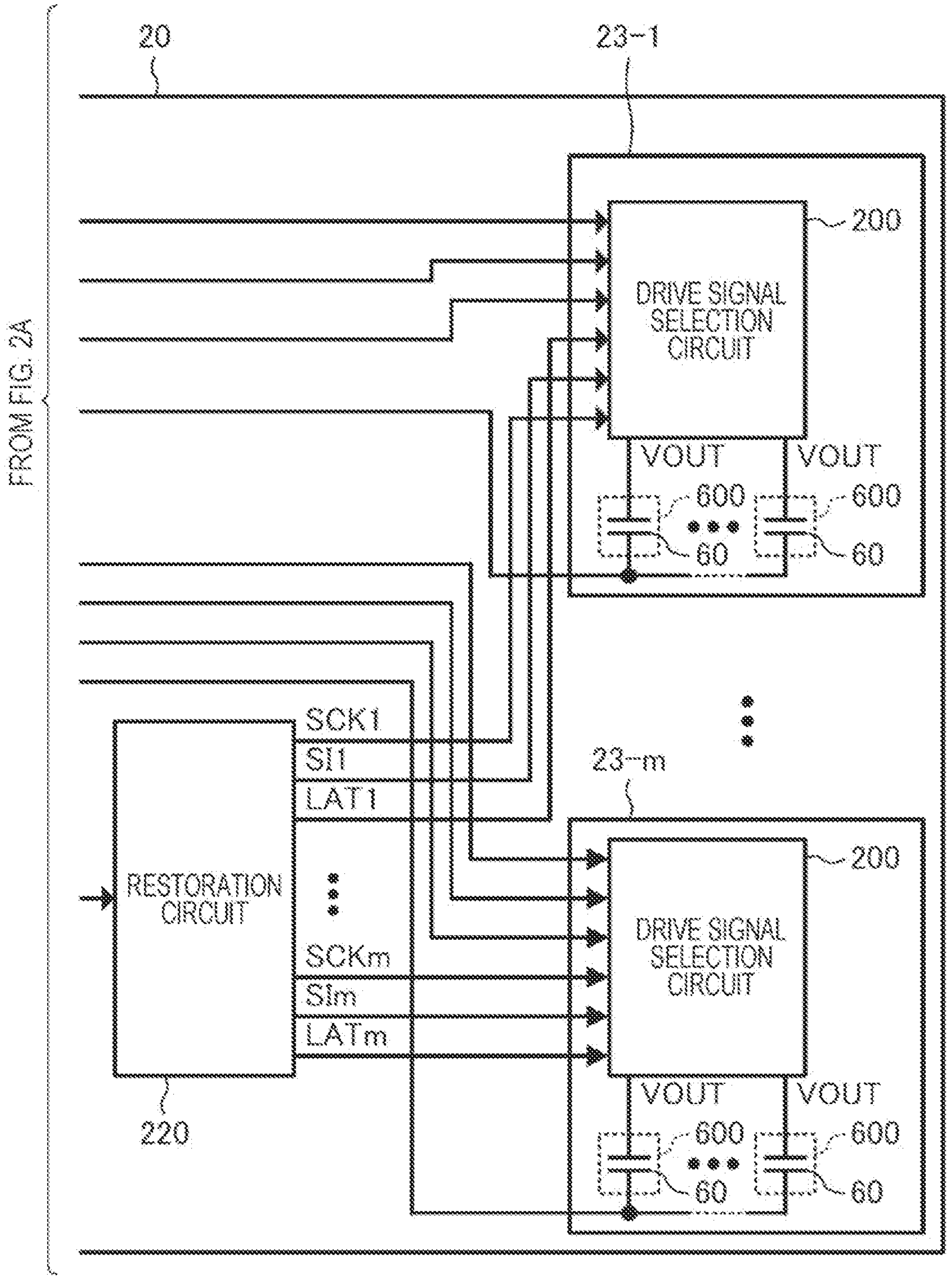

Next, a schematic configuration of the discharge unit 5 will be described. FIGS. 2A and 2B are diagrams illustrating a schematic configuration of the discharge unit 5. As illustrated in FIGS. 2A and 2B, the discharge unit 5 includes the head drive module 10 and the liquid discharge module 20. In addition, in the discharge unit 5, the head drive module 10 and the liquid discharge module 20 are electrically coupled by one or a plurality of wiring members 30.

The wiring member 30 is a flexible member for electrically coupling the head drive module 10 and the liquid discharge module 20, and is, for example, flexible printed circuits (FPC).

The head drive module 10 includes a control circuit 100, a drive signal output circuit 50-1 to 50-*m*, and a conversion circuit 120.

The control circuit 100 includes a CPU, FPGA, or the like. The image information signal IP output by the control unit 2 is input to the control circuit 100. The control circuit 100 outputs a signal for controlling each element of the discharge unit 5 based on the input image information signal IP.

The control circuit 100 generates a basic data signal dDATA for controlling the operation of the liquid discharge module 20 based on the image information signal IP, and outputs the basic data signal dDATA to the conversion circuit 120. The conversion circuit 120 converts the basic data signal dDATA into a differential signal such as low voltage differential signaling (LVDS) and outputs a data signal DATA to the liquid discharge module 20. The conversion circuit 120 may convert the basic data signal dDATA into a differential signal of a high-speed transfer method such as low voltage positive emitter coupled logic (LVPECL) or current mode logic (CML) other than LVDS and output the differential signal as the data signal DATA to the liquid discharge module 20, and may output a part or all of the basic data signal dDATA as a single-ended data signal DATA to the liquid discharge module 20.

In addition, the control circuit 100 outputs basic drive signals dA1, dB1, and dC1 to the drive signal output circuit 50-1. The drive signal output circuit 50-1 includes drive circuits 52*a*, 52*b*, and 52*c*. The basic drive signal dA1 is input to the drive circuit 52*a*. The drive circuit 52*a* generates a drive signal COMA1 by performing digital/analog conversion of the input basic drive signal dA1 and then amplifying in class D, and outputs the drive signal COMA1 to the liquid discharge module 20. The basic drive signal dB1 is input to the drive circuit 52*b*. The drive circuit 52*b* generates a drive signal COMB1 by performing digital/analog conversion of the input basic drive signal dB1 and then amplifying in class D, and outputs the drive signal COMB1 to the liquid discharge module 20. The basic drive signal dC1 is input to the drive circuit 52*c*. The drive circuit 52*c* generates a drive signal COMC1 by performing digital/analog conversion of the input basic drive signal dC1 and then amplifying in class D, and outputs the drive signal COMC1 to the liquid discharge module 20.

Here, each of the drive circuits 52*a*, 52*b*, and 52*c* may generate the drive signals COMA1, COMB1, and COMC1 by amplifying the waveforms defined by each of the input basic drive signals dA1, dB1, and dC1, and may include a class A amplifier circuit, a class B amplifier circuit, a class AB amplifier circuit, or the like in place of the class D amplifier circuit or in addition to the class D amplifier circuit. In addition, each of the basic drive signals dA1, dB1, and dC1 may be an analog signal as long as the waveforms of the corresponding drive signals COMA1, COMB1, and COMC1 can be defined.

In addition, the drive signal output circuit 50-1 includes a reference voltage output circuit 53. The reference voltage output circuit 53 generates a reference voltage signal VBS1 having a constant potential indicating the reference potential of a piezoelectric element 60 described later included in the liquid discharge module 20, and outputs the reference voltage signal VBS1 to the liquid discharge module 20. The reference voltage signal VBS1 may be, for example, a ground potential or a constant potential such as 5.5V or 6V. Here, the constant potential includes a case where it can be regarded as a substantially constant potential when a fluctuation due to an error such as a fluctuation of the potential caused by the operation of the peripheral circuit, a fluctuation of the potential caused by variations in the circuit element, and a fluctuation of the potential caused by temperature characteristics of the circuit element is taken into consideration.

The drive signal output circuits 50-2 to 50-*m* have the same configuration as the drive signal output circuit 50-1, except that the input signal and the output signal are different. That is, the drive signal output circuit 50-*j* (j is any one of 1 to m) includes a circuit corresponding to the drive circuits 52*a*, 52*b*, and 52*c* and a circuit corresponding to the reference voltage output circuit 53, generates drive signals COMAj, COMBj, and COMCj and a reference voltage signal VBSj based on the basic drive signals dAj, dBj, and dCj input from the control circuit 100, and outputs the drive signals and the reference voltage signal to the liquid discharge module 20.

Here, in the following description, the drive circuits 52*a*, 52*b*, and 52*c* included in the drive signal output circuit 50-1 and the drive circuits 52*a*, 52*b*, and 52*c* included in the drive signal output circuit 50-*j* have the same configuration, and when it is not necessary to distinguish the drive circuits, the drive circuits may be simply referred to as a drive circuit 52. In this case, the drive circuit 52 will be described as generating and outputting a drive signal COM based on the basic drive signal do. On the other hand, when distinguishing between the drive circuits 52*a*, 52*b*, and 52*c* included in the drive signal output circuit 50-1 and the drive circuits 52*a*, 52*b*, and 52*c* included in the drive signal output circuit 50-*j*, the drive circuits 52*a*, 52*b*, and 52*c* included in the drive signal output circuit 50-1 may be referred to as drive circuits 52*a*1, 52*b*1, and 52*c*1, and the drive circuits 52*a*, 52*b*, and 52*c* included in the drive signal output circuit 50-*j* may be referred to as drive circuits 52*aj*, 52*bj*, and 52*cj*.

The liquid discharge module 20 includes a restoration circuit 220 and discharge modules 23-1 to 23-*m*.

The restoration circuit 220 restores the data signal DATA to a single-ended signal, separates the data signal DATA into signals corresponding to each of the discharge modules 23-1 to 23-*m*, and outputs the data signals to the corresponding discharge modules 23-1 to 23-*m*.

Specifically, the restoration circuit 220 restores and separates the data signal DATA to generate a clock signal SCK1, a print data signal SI1, and a latch signal LAT1 corresponding to the discharge module 23-1, and outputs these signals to the discharge module 23-1. In addition, the restoration circuit 220 restores and separates the data signal DATA to generate a clock signal SCKj, a print data signal SIj, and a latch signal LATj corresponding to the discharge module 23-*j*, and outputs these signals to the discharge module 23-*j*.

As described above, the restoration circuit 220 restores the data signal DATA of the differential signal output by the head drive module 10, and separates the restored signal into signals corresponding to the discharge modules 23-1 to 23-*m*. As a result, the restoration circuit 220 generates the clock signals SCK1 to SCKm, the print data signals SI1 to SIm, and the latch signals LAT1 to LATm corresponding to each of the discharge modules 23-1 to 23-*m*, and outputs these signals to the corresponding discharge modules 23-1 to 23-*m*. Any one of the clock signals SCK1 to SCKm, the print data signals SI1 to SIm, and the latch signals LAT1 to LATm corresponding to each of the discharge modules 23-1 to 23-*m* output by the restoration circuit 220 may be common signals to the discharge modules 23-1 to 23-*m*.

Here, in view of the fact that the restoration circuit 220 generates the clock signals SCK1 to SCKm, the print data signals SI1 to SIm, and the latch signals LAT1 to LATm by restoring and separating the data signal DATA, the data signal DATA output by the control circuit 100 is a differential signal corresponding to the clock signals SCK1 to SCKm, the print data signals SI1 to SIm, and the latch signals LAT1 to LATm. The basic data signal dDATA on which the data signal DATA is based includes signals corresponding to each of the clock signals SCK1 to SCKm, the print data signals SI1 to SIm, and the latch signals LAT1 to LATm. That is, the basic data signal dDATA includes a signal for controlling the operation of the discharge modules 23-1 to 23-*m* included in the liquid discharge module 20.

The discharge module 23-1 includes a drive signal selection circuit 200 and a plurality of discharge portions 600. In addition, each of the plurality of discharge portions 600 includes a piezoelectric element 60.

The drive signals COMA1, COMB1, and COMC1, the reference voltage signal VBS1, the clock signal SCK1, the print data signal SI1, and the latch signal LAT1 are input to the discharge module 23-1. The drive signals COMA1, COMB1, and COMC1, the clock signal SCK1, the print data signal SI1, and the latch signal LAT1 are input to the drive signal selection circuit 200 included in the discharge module 23-1. The drive signal selection circuit 200 generates a drive signal VOUT by selecting or not selecting each of the drive signals COMA1, COMB1, and COMC1 based on the input clock signal SCK1, the print data signal SI1, and the latch signal LAT1, and supplies the drive signal VOUT to one end of the piezoelectric element 60 included in the corresponding discharge portion 600. At this time, the reference voltage signal VBS1 is supplied to the other end of the piezoelectric element 60. The piezoelectric element 60 is driven by the potential difference between the drive signal VOUT supplied to one end and the reference voltage signal VBS1 supplied to the other end, so that ink is discharged from the corresponding discharge portion 600.

Similarly, the discharge module 23-*j* includes the drive signal selection circuit 200 and the plurality of discharge portions 600. In addition, each of the plurality of discharge portions 600 includes a piezoelectric element 60.

The drive signals COMAj, COMBj, and COMCj, the reference voltage signal VBSj, the clock signal SCKj, the print data signal SIj, and the latch signal LATj are input to the discharge module 23-*j*. The drive signals COMAj, COMBj, and COMCj, the clock signal SCKj, the print data signal SIj, and the latch signal LATj are input to the drive signal selection circuit 200 included in the discharge module 23-*j*. The drive signal selection circuit 200 generates a drive signal VOUT by selecting or not selecting each of the drive signals COMAj, COMBj, and COMCj based on the input clock signal SCKj, the print data signal SIj, and the latch signal LATj, and supplies the drive signal VOUT to one end of the piezoelectric element 60 included in the corresponding discharge portion 600. In addition, the reference voltage signal VBSj is supplied to the other end of the piezoelectric element 60. The piezoelectric element 60 is driven by the potential difference between the drive signal VOUT supplied to one end and the reference voltage signal VBSj supplied to the other end, so that ink is discharged from the corresponding discharge portion 600.

The liquid discharge device 1 of the first embodiment configured as described above, controls the transport of the medium P by the transport unit 4, and also controls the discharge of ink from the liquid discharge module 20 included in the discharge unit 5, based on image data supplied from a host computer or the like (not illustrated) by the control unit 2. As a result, the liquid discharge device 1 can land a desired amount of ink at a desired position on the medium P, and forms a desired image on the medium P.

Here, the discharge modules 23-1 to 23-*m* included in the liquid discharge module 20 have the same configuration except that the input signals are different. Therefore, in the following description, when it is not necessary to distinguish the discharge modules 23-1 to 23-*m*, the discharge modules may be simply referred to as a discharge module 23. In addition, in this case, the drive signals COMA1 to COMAm input to the discharge module 23 may be referred to as a drive signal COMA, the drive signals COMB1 to COMBm may be referred to as a drive signal COMB, and the drive signals COMC1 to COMCm may be referred to as a drive signal COMC. The reference voltage signals VBS1 to VBSm may be referred to as a reference voltage signal VBS, the clock signals SCK1 to SCKm may be referred to as a clock signal SCK, the print data signals SI1 to SIm may be referred to as a print data signal SI, and the latch signals LAT1 to LATm may be referred to as a latch signal LAT.

That is, the drive signals COMA, COMB, and COMC, the reference voltage signal VBS, the clock signal SCK, the print data signal SI, and the latch signal LAT are input to the discharge module 23. The drive signals COMA, COMB, and COMC, the clock signal SCK, the print data signal SI, and the latch signal LAT are input to the drive signal selection circuit 200 included in the discharge module 23. The drive signal selection circuit 200 generates a drive signal VOUT by selecting or not selecting each of the drive signals COMA, COMB, and COMC based on the input clock signal SCK, the print data signal SI, and the latch signal LAT, and supplies the drive signal VOUT to one end of the piezoelectric element 60 included in the corresponding discharge portion 600. At this time, the reference voltage signal VBS is supplied to the other end of the piezoelectric element 60. The piezoelectric element 60 is driven by the potential difference between the drive signal VOUT supplied to one end and the reference voltage signal VBSj supplied to the other end, so that ink is discharged from the corresponding discharge portion 600.

As described above, the liquid discharge device 1 in the present embodiment is provided with the liquid discharge module 20 that includes the discharge module 23 discharging ink in response to the drive of the piezoelectric element 60, the head drive module 10 that includes the drive signal output circuits 50-1 to 50-*m* outputting the drive signals COMA, COMB, and COMC, and the wiring member 30 whose one end electrically coupled to the head drive module 10 and the other end electrically coupled to the liquid discharge module 20. Here, the piezoelectric element 60 is an example of a drive element, and the discharge module 23 that discharges ink in response to the drive of the piezoelectric element 60 or the liquid discharge module 20 that includes the discharge module 23 is an example of a discharge head. The head drive module 10 that includes one of the drive signal output circuits 50-1 to 50-*m* outputting the drive signals COMA, COMB, and COMC or the drive signal output circuits 50-1 to 50-*m* is an example of a head drive circuit.

1.2 Functional Configuration of Drive Signal Selection Circuit

Next, the configuration and operation of the drive signal selection circuit 200 included in the discharge module 23 will be described. In describing the configuration and operation of the drive signal selection circuit 200 included in the discharge module 23, first, an example of signal waveforms included in the drive signals COMA, COMB, and COMC input to the drive signal selection circuit 200 will be described.

Figure 3:
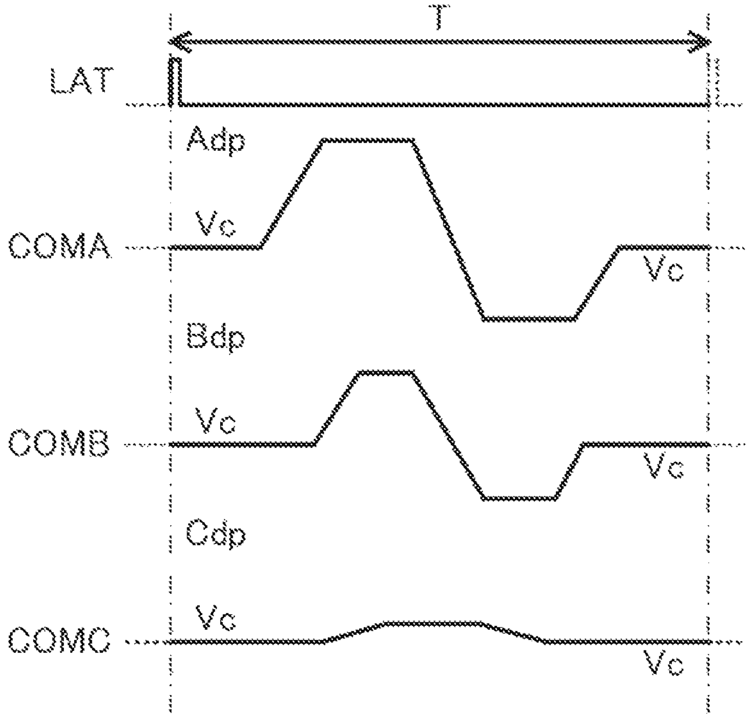
FIG. 3 is a diagram illustrating an example of signal waveforms of drive signals.

FIG. 3 is a diagram illustrating an example of the signal waveforms of the drive signals COMA, COMB, and COMC. As illustrated in FIG. 3, the drive signal COMA includes a trapezoidal waveform Adp arranged in a cycle T from the rise of the latch signal LAT to the rise of the next latch signal LAT. The trapezoidal waveform Adp is a signal waveform that is supplied to one end of the piezoelectric element 60 to discharge a predetermined amount of ink from the discharge portion 600 corresponding to the piezoelectric element 60. The drive signal COMB includes a trapezoidal waveform Bdp arranged in the cycle T. This trapezoidal waveform Bdp is a signal waveform whose voltage amplitude is smaller than that of the trapezoidal waveform Adp, and is a signal waveform that is supplied to one end of the piezoelectric element 60 to discharge a smaller amount of ink than a predetermined amount from the discharge portion 600 corresponding to the piezoelectric element 60. The drive signal COMC includes a trapezoidal waveform Cdp arranged in the cycle T. This trapezoidal waveform Cdp is a signal waveform whose voltage amplitude is smaller than that of the trapezoidal waveforms Adp and Bdp, and is a signal waveform that is supplied to one end of the piezoelectric element 60 to vibrate the ink in the vicinity of a nozzle opening portion to the extent that the ink is not discharged from the discharge portion 600 corresponding to the piezoelectric element 60. The trapezoidal waveform Cdp is supplied to the piezoelectric element 60 to vibrate the ink in the vicinity of the nozzle opening portion of the discharge portion 600 including the piezoelectric element 60. As a result, the possibility that the viscosity of the ink in the vicinity of the nozzle opening portion increases is reduced.

That is, the drive signal COMA is a signal that drives the piezoelectric element 60 so that ink is discharged, the drive signal COMB is a signal that drives the piezoelectric element 60 so that ink is discharged, and the drive signal COMC is a signal that drives the piezoelectric element 60 so that the ink is not discharged. The amount of ink discharged from the liquid discharge module 20 including the discharge module 23 when such a drive signal COMA is supplied to the piezoelectric element 60 and the amount of ink discharged from the liquid discharge module 20 including the discharge module 23 when the drive signal COMB is supplied to the piezoelectric element 60 are different from each other.

In addition, at the start timing and end timing of each of the trapezoidal waveforms Adp, Bdp, and Cdp, the voltage values of the trapezoidal waveforms Adp, Bdp, and Cdp are all common to the voltage Vc. That is, each of the trapezoidal waveforms Adp, Bdp, and Cdp are signal waveforms that start at the voltage Vc and end at the voltage Vc.

Here, in the following description, when the trapezoidal waveform Adp is supplied to one end of the piezoelectric element 60, the amount of ink discharged from the discharge portion 600 corresponding to the piezoelectric element 60 may be referred to as a large amount. When the trapezoidal waveform Bdp is supplied to one end of the piezoelectric element 60, the amount of ink discharged from the discharge portion 600 corresponding to the piezoelectric element 60 may be referred to as a small amount. In addition, when the trapezoidal waveform Cdp is supplied to one end of the piezoelectric element 60, vibrating the ink in the vicinity of the nozzle opening portion to the extent that the ink is not discharged from the discharge portion 600 corresponding to the piezoelectric element 60 may be referred to as micro-vibration.

FIG. 3 illustrates a case where each of the drive signals COMA, COMB, and COMC includes one trapezoidal waveform in the cycle T, but each of the drive signals COMA, COMB, and COMC may include two or more consecutive trapezoidal waveforms in the cycle T. In this case, a signal defining the switching timing of two or more trapezoidal waveforms is input to the drive signal selection circuit 200, and the discharge portion 600 discharges ink a plurality of times in the cycle T. The ink discharged in the plurality of times in the cycle T lands on the medium P and is bonded to form one dot on the medium P. As a result, the number of gradations of dots formed on the medium P can be increased.

On the other hand, in the liquid discharge device 1 described in the first embodiment, it will be described as assuming that the drive signals COMA, COMB, and COMC are signals including one trapezoidal waveform in the cycle T. As a result, the cycle T for forming dots on the medium P can be shortened, and the image formation speed on the medium P can be increased. The drive signals COMA, COMB, and COMC are supplied to the liquid discharge module 20 in parallel, so that the number of gradations of dots formed on the medium P is also increased. Here, the cycle T from the rise of the latch signal LAT to the next rise of the latch signal LAT may be referred to as a dot formation cycle for forming dots of a desired size on the medium P.

The signal waveforms included in the drive signals COMA, COMB, and COMC are not limited to the signal waveforms exemplified in FIG. 3, and various signal waveforms may be used depending on the type of ink discharged from the discharge portion 600, the number of piezoelectric elements 60 driven by drive signals COMA, COMB, and COMC, the wiring length propagated by the drive signals COMA, COMB, and COMC, and the like. That is, each of the drive signals COMA1 to COMAm illustrated in FIGS. 2A and 2B may include signal waveforms different from each other, and similarly, each of the drive signals COMB1 to COMBm and the drive signals COMC1 to COMCm may include signal waveforms different from each other.

Figure 4:
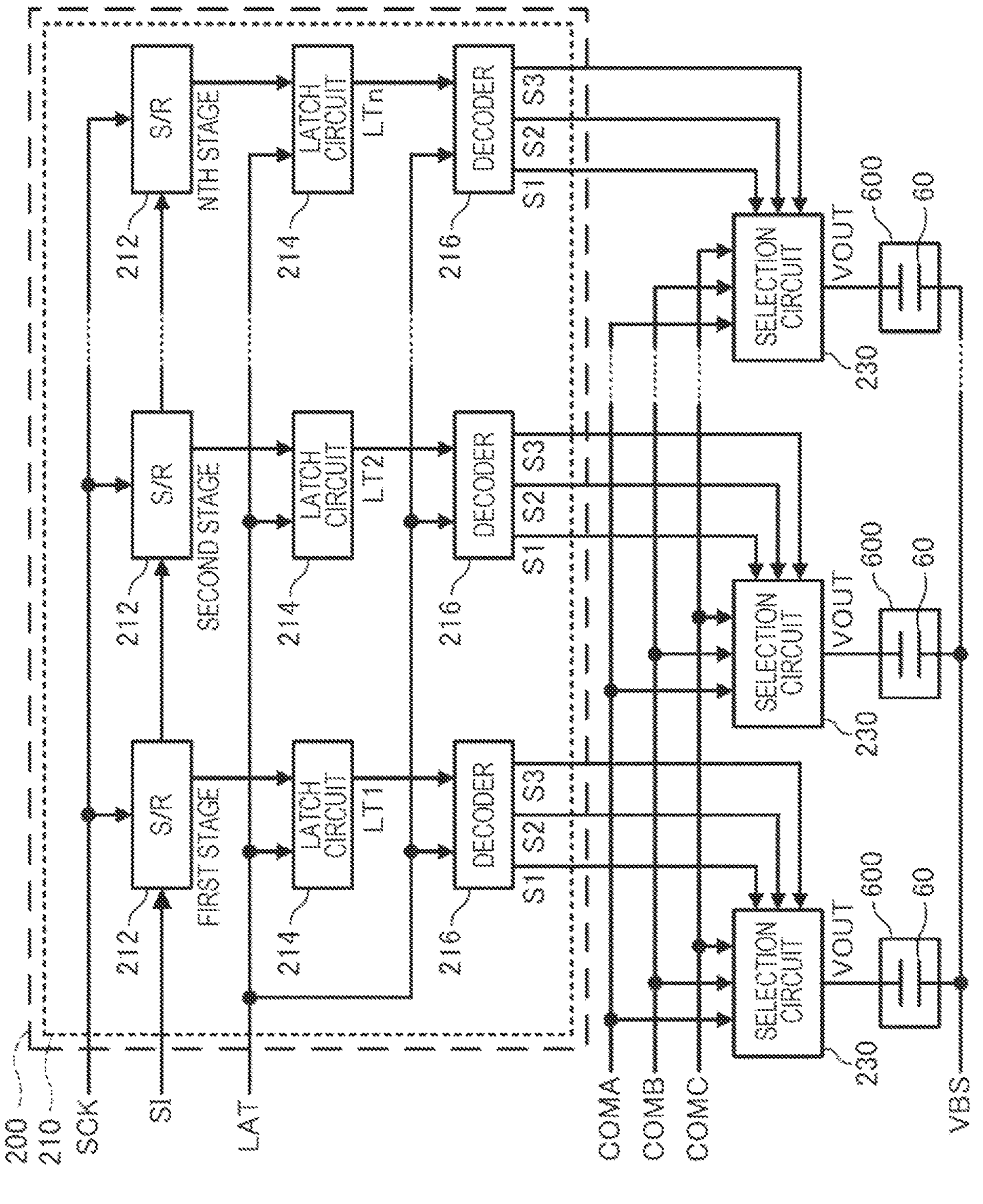
FIG. 4 is a diagram illustrating a functional configuration of a drive signal selection circuit.

Next, the configuration and operation of the drive signal selection circuit 200 that outputs the drive signal VOUT by selecting or not selecting each of the drive signals COMA, COMB, and COMC will be described. FIG. 4 is a diagram illustrating a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are input to the selection control circuit 210. In addition, the selection control circuit 210 includes a set of a shift register (S/R) 212, a latch circuit 214, and a decoder 216 corresponding to each of the n discharge portions 600. That is, the drive signal selection circuit 200 includes n shift registers 212, n latch circuits 214, and n decoders 216, which are the same as the total number of discharge portions 600.

The print data signal SI is a signal synchronized with the clock signal SCK, and includes 2-bit print data [SIH, SIL] for defining the dot size formed by the ink discharged from each of the n discharge portions 600 by any of “large dot LD”, “small dot SD”, “non-discharge ND”, and “micro-vibration BSD”. This print data signal SI is held in the shift register 212 corresponding to the discharge portion 600 for each 2-bit print data [SIH, SIL].

Specifically, the n shift registers 212 corresponding to the discharge portion 600 are coupled in cascade to each other. The serially input print data signal SI is sequentially transferred to a subsequent stage of the shift register 212 coupled in cascade according to the clock signal SCK. When the supply of the clock signal SCK is stopped, the 2-bit print data [SIH, SIL] corresponding to the discharge portion 600 corresponding to the shift register 212 is held in the n shift registers 212. In FIG. 4, in order to distinguish the n shift registers 212 coupled in cascade, the shift registers are expressed as first stage, second stage, . . . , Nth stage from the upstream to the downstream where the print data signal SI is input.

Each of the n latch circuits 214 latches simultaneously the 2-bit print data [SIH, SIL] held by the corresponding shift register 212 at the rise of the latch signal LAT.

Figures 5, 6:
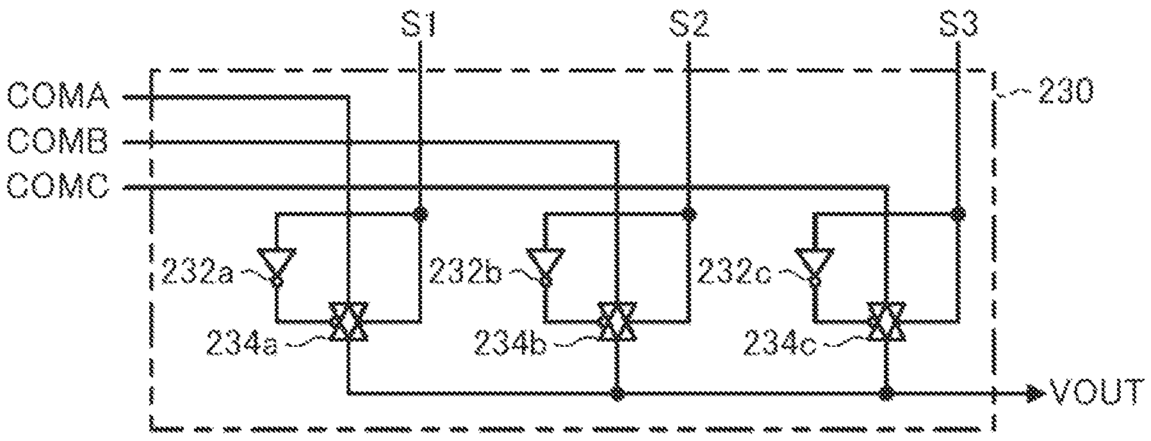
FIG. 5 is a table illustrating an example of a decoding content in a decoder.
FIG. 6 is a diagram illustrating an example of a configuration of a selection circuit.

Each of the n decoders 216 decodes the 2-bit print data [SIH, SIL] latched by the corresponding latch circuit 214, and outputs the logic level selection signals S1, S2, and S3 according to a decoding content for each cycle T. FIG. 5 is a table illustrating an example of the decoding content in the decoder 216. The decoder 216 outputs the logic level selection signals S1, S2, and S3 defined by the latched 2-bit print data [SIH, SIL] and the decoding content illustrated in FIG. 5. For example, when the 2-bit print data [SIH, SIL] latched by the corresponding latch circuit 214 is [1, 0], the decoder 216 in the first embodiment sets each of the logic levels of the selection signals S1, S2, and S3 to the L, H, and L levels in the cycle T.

The selection circuit 230 is provided corresponding to each of the n discharge portions 600. That is, the drive signal selection circuit 200 includes n selection circuits 230. The selection signals S1, S2, and S3 output by the decoder 216 corresponding to the same discharge portion 600 and the drive signals COMA, COMB, and COMC are input to the selection circuit 230. The selection circuit 230 generates a drive signal VOUT by selecting or not selecting each of the drive signals COMA, COMB, and COMC based on the selection signals S1, S2, and S3 and the drive signals COMA, COMB, and COMC, and outputs the drive signal VOUT to the corresponding discharge portion 600.

FIG. 6 is a diagram illustrating an example of a configuration of the selection circuit 230 corresponding to one discharge portion 600. As illustrated in FIG. 6, the selection circuit 230 includes inverters 232*a*, 232*b*, and 232*c* and transfer gates 234*a*, 234*b*, and 234*c*.

The selection signal S1 is input to a positive control end not marked with a circle at the transfer gate 234*a*, while being logically inverted by the inverter 232*a* and input to a negative control end marked with a circle at the transfer gate 234*a*. In addition, the drive signal COMA is supplied to an input terminal of the transfer gate 234*a*. The transfer gate 234*a* is conductive between the input terminal and the output terminal when the input selection signal S1 is H level, and is non-conductive between the input terminal and the output terminal when the input selection signal S1 is L level. That is, the transfer gate 234*a* outputs the drive signal COMA to the output terminal when the selection signal S1 is H level, and does not output the drive signal COMA to the output terminal when the selection signal S1 is L level.

The selection signal S2 is input to a positive control end not marked with a circle in the transfer gate 234*b*, while being logically inverted by the inverter 232*b* and input to a negative control end marked with a circle in the transfer gate 234*b*. In addition, the drive signal COMB is supplied to the input terminal of the transfer gate 234*b*. The transfer gate 234*b* is conductive between the input terminal and the output terminal when the input selection signal S2 is H level, and is non-conductive between the input terminal and the output terminal when the input selection signal S2 is L level. That is, the transfer gate 234*b* outputs the drive signal COMB to the output terminal when the selection signal S2 is H level, and does not output the drive signal COMB to the output terminal when the selection signal S2 is L level.

The selection signal S3 is input to a positive control end not marked with a circle in the transfer gate 234*c*, while being logically inverted by the inverter 232*c* and input to a negative control end marked with a circle in the transfer gate 234*c*. In addition, the drive signal COMC is supplied to the input terminal of the transfer gate 234*c*. The transfer gate 234*c* is conductive between the input terminal and the output terminal when the input selection signal S3 is H level, and is non-conductive between the input terminal and the output terminal when the input selection signal S3 is L level. That is, the transfer gate 234*c* outputs the drive signal COMC to the output terminal when the selection signal S3 is H level, and does not output the drive signal COMC to the output terminal when the selection signal S3 is L level.

The output terminals of the transfer gates 234*a*, 234*b*, and 234*c* are commonly coupled. That is, the drive signals COMA, COMB, and COMC selected or not selected by the selection signals S1, S2, and S3 are supplied to the output terminals of the transfer gates 234*a*, 234*b*, and 234*c* commonly coupled. The selection circuit 230 outputs the signal supplied to the output terminals commonly coupled to the corresponding discharge portion 600 as the drive signal VOUT.

Figure 7:
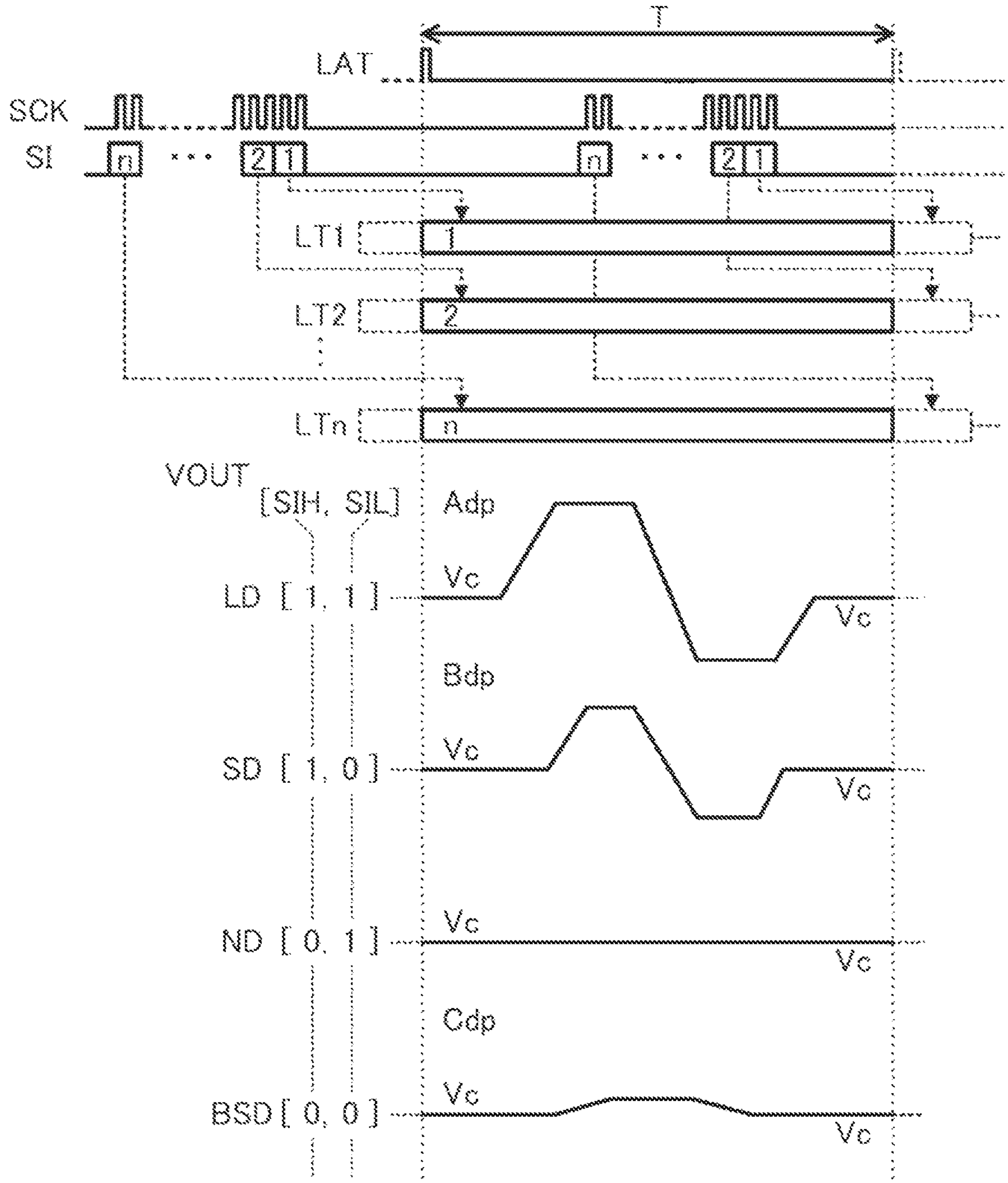
FIG. 7 is a diagram for describing an operation of the drive signal selection circuit.

An operation of the drive signal selection circuit 200 will be described. FIG. 7 is a diagram for describing the operation of the drive signal selection circuit 200. The print data signal SI is serially input in synchronization with the clock signal SCK, and is sequentially transferred by the shift register 212 corresponding to the discharge portion 600. When the input of the clock signal SCK is stopped, the 2-bit print data [SIH, SIL] corresponding to each of the discharge portions 600 is held in the corresponding shift register 212.

Thereafter, when the latch signal LAT rises, the 2-bit print data [SIH, SIL] held in the shift register 212 are simultaneously latched by the latch circuit 214. In FIG. 7, the 2-bit print data [SIH, SIL] corresponding to first stage, second stage, . . . , Nth stage shift registers 212 latched by the latch circuit 214 are illustrated as LT1, LT2, . . . , LTn.

The decoder 216 outputs the logic level selection signals S1, S2, and S3 according to the dot size defined by the latched 2-bit print data [SIH, SIL].

Specifically, when the print data [SIH, SIL] is [1, 1], the decoder 216 outputs the logic levels of the selection signals S1, S2, and S3 to the selection circuit 230 as the H, L, and L levels in the cycle T. As a result, the selection circuit 230 selects the trapezoidal waveform Adp in the cycle T and outputs the drive signal VOUT corresponding to the “large dot LD”. In addition, when the print data [SIH, SIL] is [1, 0], the decoder 216 outputs the logic levels of the selection signals S1, S2, and S3 to the selection circuit 230 as the L, H, and L levels in the cycle T. As a result, the selection circuit 230 selects the trapezoidal waveform Bdp in the cycle T and outputs the drive signal VOUT corresponding to the “small dot SD”. In addition, when the print data [SIH, SIL] is [0, 1], the decoder 216 outputs the logic levels of the selection signals S1, S2, and S3 to the selection circuit 230 as the L, L, and L levels in the cycle T. As a result, the selection circuit 230 does not select any of the trapezoidal waveforms Adp, Bdp, and Cdp in the cycle T, and outputs the drive signal VOUT corresponding to a constant “non-discharge ND” at the voltage Vc. In addition, when the print data [SIH, SIL] is [0, 0], the decoder 216 outputs the logic levels of the selection signals S1, S2, and S3 to the selection circuit 230 as the L, L, and H levels in the cycle T. As a result, the selection circuit 230 selects the trapezoidal waveform Cdp in the cycle T and outputs the drive signal VOUT corresponding to the “micro-vibration BSD”.

Here, when the selection circuit 230 does not select any of the trapezoidal waveforms Adp, Bdp, and Cdp, the voltage Vc supplied immediately before the piezoelectric element 60 is held by the capacitance component of the piezoelectric element 60 at one end of the corresponding piezoelectric element 60. That is, the fact that the selection circuit 230 outputs a constant drive signal VOUT at the voltage Vc includes the case where the voltage Vc immediately before being held by the capacitance component of the piezoelectric element 60 is supplied to the piezoelectric element 60 as the drive signal VOUT, when none of the trapezoidal waveforms Adp, Bdp, and Cdp is selected as the drive signal VOUT.

As described above, the drive signal selection circuit 200 generates a drive signal VOUT corresponding to each of the plurality of discharge portions 600 by selecting or not selecting the drive signals COMA, COMB, and COMC based on the print data signal SI, the latch signal LAT, and the clock signal SCK, and outputs the drive signal VOUT to the corresponding discharge portion 600. As a result, the amount of ink discharged from each of the plurality of discharge portions 600 is individually controlled.

1.3 Configuration of Liquid Discharge Module

Figure 8:
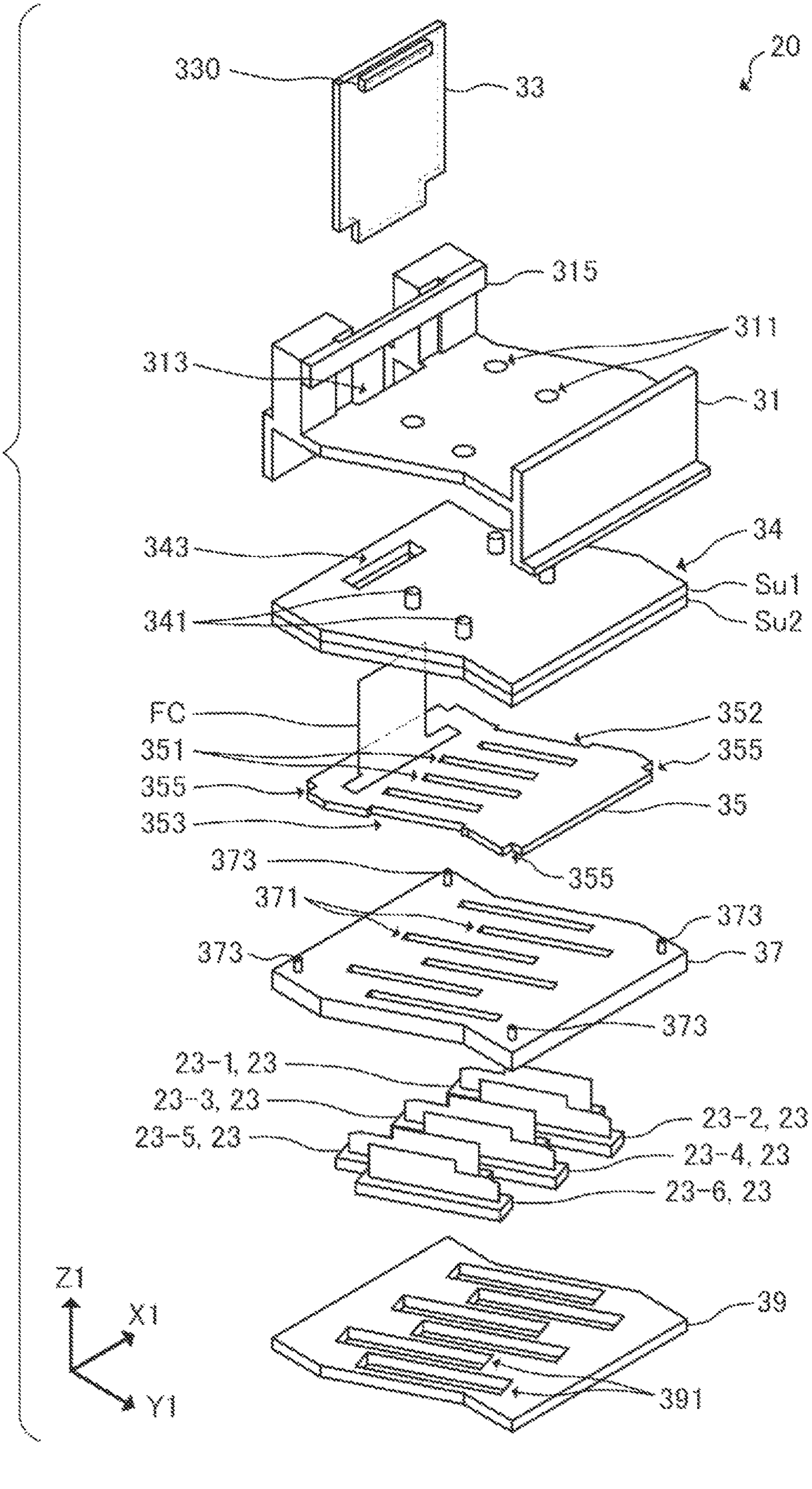
FIG. 8 is a diagram illustrating a structure of a liquid discharge module.
Figure 9:
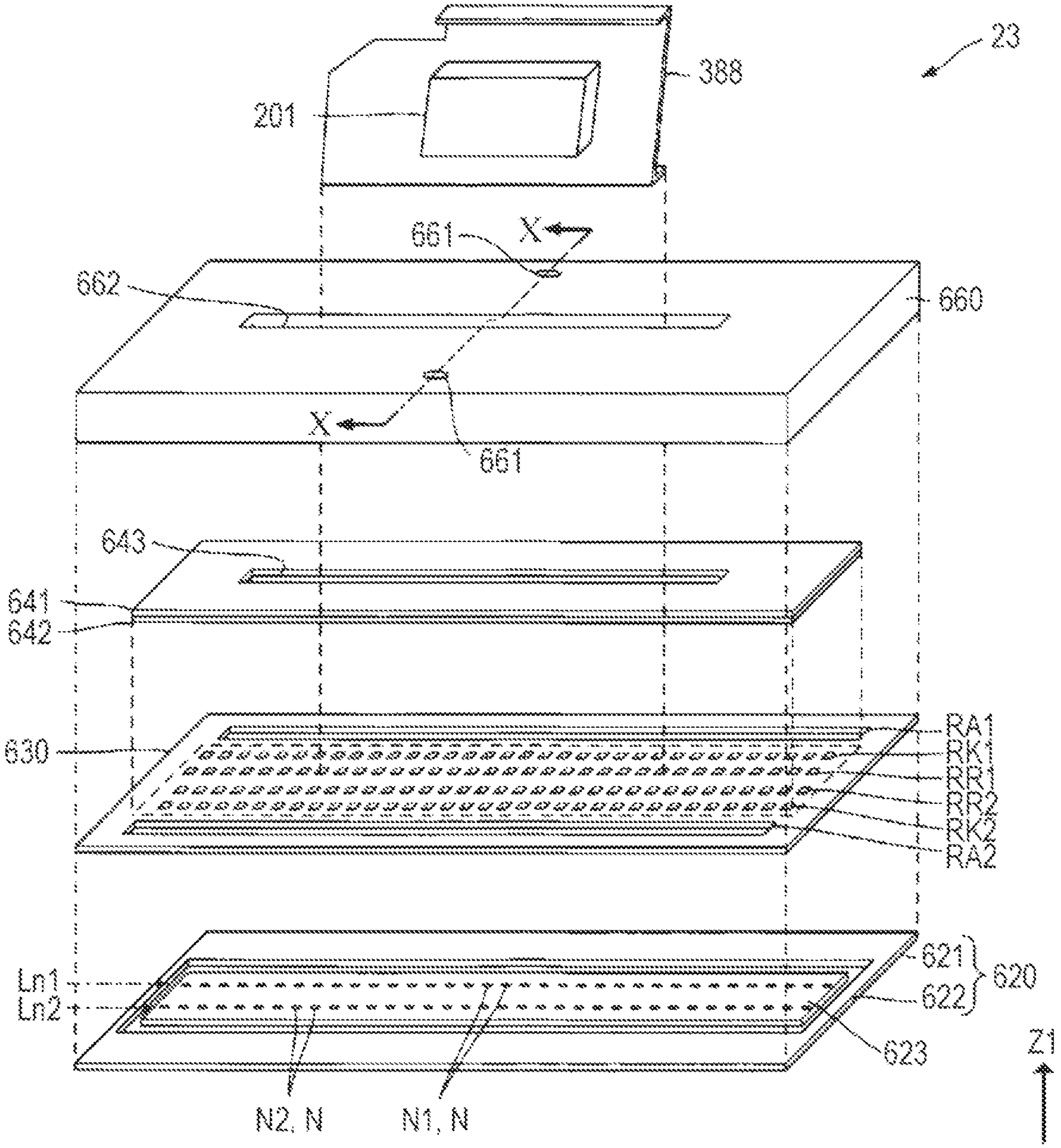
FIG. 9 is a diagram illustrating an example of a structure of a discharge module.
Figure 10:
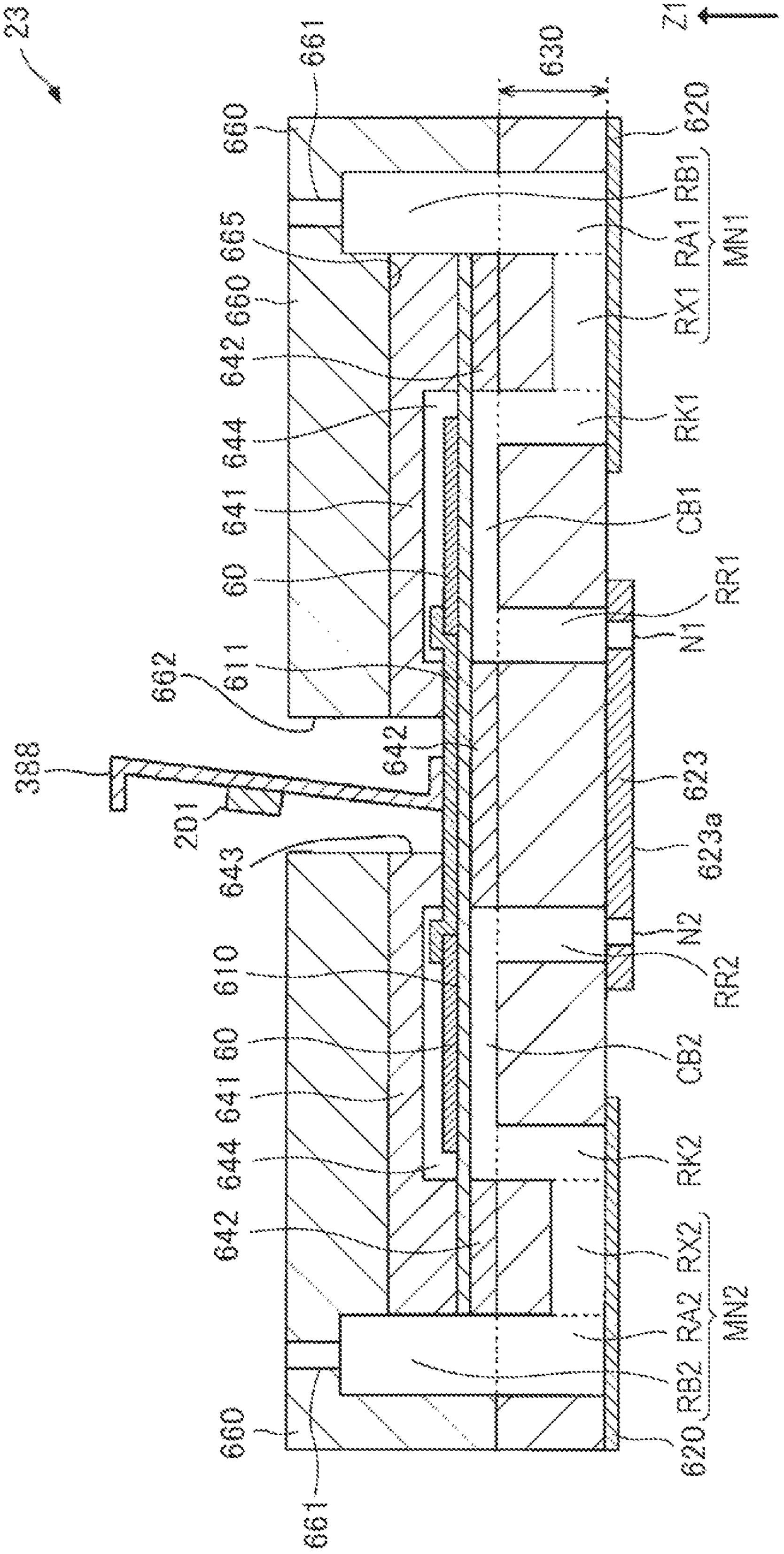
FIG. 10 is a cross-sectional view taken along the line X-X illustrated in FIG. 9 when the discharge module is cut.

Next, the structure of the liquid discharge module 20 will be described with reference to FIGS. 8 to 10. FIG. 8 is a diagram illustrating the structure of the liquid discharge module 20. Here, in describing the structure of the liquid discharge module 20, FIGS. 8 to 10 illustrate arrows indicating the X1 direction, the Y1 direction, and the Z1 direction orthogonal to each other. In addition, in the description of FIGS. 8 to 10, the starting point side of the arrow indicating the X1 direction may be referred to as a −X1 side, the tip end side may be referred to as a +X1 side, the starting point side of the arrow indicating the Y1 direction may be referred to as a −Y1 side, the tip end side may be referred to as a +Y1 side, the starting point side of the arrow indicating the Z1 direction may be referred to as a −Z1 side, and the tip end side may be referred to as a +Z1 side. In addition, in the following description, the liquid discharge module 20 included in the liquid discharge device 1 according to the first embodiment will be described as having six discharge modules 23, and when each of the six discharge modules 23 is distinguished, the discharge modules may be referred to as discharge modules 23-1 to 23-6.

The liquid discharge module 20 includes a housing 31, an aggregate substrate 33, a flow path structure 34, a head substrate 35, a distribution flow path 37, a fixing plate 39, and discharge modules 23-1 to 23-6. In the liquid discharge module 20, the flow path structure 34, the head substrate 35, the distribution flow path 37, and the fixing plate 39 are laminated in the order of the fixing plate 39, the distribution flow path 37, the head substrate 35, and the flow path structure 34 from the −Z1 side to the +Z1 side along the Z1 direction. The housing 31 is located around the flow path structure 34, the head substrate 35, the distribution flow path 37, and the fixing plate 39 so as to support the flow path structure 34, the head substrate 35, the distribution flow path 37, and the fixing plate 39. The aggregate substrate 33 is erected on the +Z1 side of the housing 31 while being held by the housing 31, and the six discharge modules 23 are located between the distribution flow path 37 and the fixing plate 39 so that a part of the six discharge modules 23 is exposed to the outside of the liquid discharge module 20.

In describing the structure of the liquid discharge module 20, first, the structure of the discharge module 23 included in the liquid discharge module 20 will be described. FIG. 9 is a diagram illustrating an example of the structure of the discharge module 23. In addition, FIG. 10 is a diagram illustrating an example of a cross section of the discharge module 23. Here, FIG. 10 is a cross-sectional view of the discharge module 23 illustrated in FIG. 9 when the discharge module 23 is cut along the line X-X illustrated in FIG. 9, and the line X-X illustrated in FIG. 9 is a virtual line segment that passes through an introduction path 661 of the discharge module 23 and passes through a nozzle N1 and a nozzle N2.

As illustrated in FIGS. 9 and 10, the discharge module 23 includes a plurality of nozzles N1 arranged side by side and a plurality of nozzles N2 arranged side by side. The total number of nozzles N1 and nozzles N2 included in the discharge module 23 is n, which is the same as the number of discharge portions 600 included in the discharge module 23. In the first embodiment, the number of nozzles N1 and the number of nozzles N2 included in the discharge module 23 will be described as being the same. That is, the discharge module 23 will be described as having n/2 nozzles N1 and n/2 nozzles N2. Here, when it is not necessary to distinguish between the nozzle N1 and the nozzle N2 in the following description, the nozzles may be simply referred to as a nozzle N.

The discharge module 23 includes a wiring member 388, a case 660, a protective substrate 641, a flow path formation substrate 642, a communication plate 630, a compliance substrate 620, and a nozzle plate 623.

On the flow path formation substrate 642, pressure chambers CB1 partitioned by a plurality of partition walls by anisotropic etching from one surface side are arranged side by side corresponding to the nozzle N1, and pressure chambers CB2 partitioned by a plurality of partition walls by anisotropic etching from one surface side are arranged side by side corresponding to the nozzle N2. Here, in the following description, when it is not necessary to distinguish between the pressure chamber CB1 and the pressure chamber CB2, the pressure chambers may be simply referred to as a pressure chamber CB.

The nozzle plate 623 is located on the −Z1 side of the flow path formation substrate 642. The nozzle plate 623 is provided with a nozzle row Ln1 formed by n/2 nozzles N1 and a nozzle row Ln2 formed by n/2 nozzles N2. Here, in the following description, the surface of the nozzle plate 623 on which the nozzle N opens on the −Z1 side may be referred to as a liquid ejection surface 623*a*.

The communication plate 630 is located on the −Z1 side of the flow path formation substrate 642 and on the +Z1 side of the nozzle plate 623. The communication plate 630 is provided with a nozzle communication path RR1 that communicates with the pressure chamber CB1 and the nozzle N1, and a nozzle communication path RR2 that communicates with the pressure chamber CB2 and the nozzle N2. In addition, the communication plate 630 is provided with a pressure chamber communication path RK1 for communicating the end portion of the pressure chamber CB1 and a manifold MN1 and a pressure chamber communication path RK2 for communicating the end portion of the pressure chamber CB2 and a manifold MN2 independently corresponding to each of the pressure chambers CB1 and CB2.

The manifold MN1 includes a supply communication path RA1 and a coupling communication path RX1. The supply communication path RA1 is provided so as to penetrate the communication plate 630 along the Z1 direction, and is provided halfway in the Z1 direction by opening the coupling communication path RX1 toward the nozzle plate 623 of the communication plate 630 without penetrating the communication plate 630 in the Z1 direction. Similarly, the manifold MN2 includes a supply communication path RA2 and a coupling communication path RX2. The supply communication path RA2 is provided so as to penetrate the communication plate 630 along the Z1 direction, and is provided halfway in the Z1 direction by opening the coupling communication path RX2 toward the nozzle plate 623 of the communication plate 630 without penetrating the communication plate 630 in the Z1 direction. The coupling communication path RX1 included in the manifold MN1 communicates with the corresponding pressure chamber CB1 by the pressure chamber communication path RK1, and the coupling communication path RX2 included in the manifold MN2 communicates with the corresponding pressure chamber CB2 by the pressure chamber communication path RK2.

Here, in the following description, when it is not necessary to distinguish between the nozzle communication path RR1 and the nozzle communication path RR2, the nozzle communication paths may be simply referred to as a nozzle communication path RR, and it is not necessary to distinguish between the manifold MN1 and the manifold MN2, the manifolds may be simply referred to as a manifold MN. When it is not necessary to distinguish between the supply communication path RA1 and the supply communication path RA2, the supply communication paths may be simply referred to as a supply communication path RA, and when it is not necessary to distinguish between the coupling communication path RX1 and the coupling communication path RX2, the coupling communication paths may be simply referred to as a coupling communication path RX.

A diaphragm 610 is located on the surface of the flow path formation substrate 642 on the +Z1 side. In addition, the piezoelectric elements 60 are formed in two rows corresponding to the nozzles N1 and N2 on the surface of the diaphragm 610 on the +Z1 side. One electrode of the piezoelectric element 60 and the piezoelectric layer are formed for each pressure chamber CB, and the other electrode of the piezoelectric element 60 is configured as a common electrode common to the pressure chamber CB. The drive signal VOUT is supplied from the drive signal selection circuit 200 to one electrode of the piezoelectric element 60, and the reference voltage signal VBS is supplied to the common electrode which is the other electrode of the piezoelectric element 60.

The protective substrate 641 is bonded to the surface of the flow path formation substrate 642 on the +Z1 side. The protective substrate 641 forms a protective space 644 for protecting the piezoelectric element 60. In addition, the protective substrate 641 is provided with a through-hole 643 penetrating along the Z1 direction. The end portion of a lead electrode 611 drawn from the electrode of the piezoelectric element 60 is extended so as to be exposed inside the through-hole 643. The wiring member 388 is electrically coupled to the end portion of the lead electrode 611 exposed inside the through-hole 643.

In addition, a case 660 that defines a part of the manifold MN communicating with a plurality of pressure chambers CB is fixed to the protective substrate 641 and the communication plate 630. The case 660 is bonded to the protective substrate 641 and also to the communication plate 630. Specifically, the case 660 includes a recessed portion 665 in which the flow path formation substrate 642 and the protective substrate 641 are accommodated on the surface on the −Z1 side. The recessed portion 665 has a wider opening area than that of the surface on which the protective substrate 641 is bonded to the flow path formation substrate 642. The opening surface of the recessed portion 665 on the −Z1 side is sealed by the communication plate 630 in a state where the flow path formation substrate 642 and the like are accommodated in the recessed portion 665. As a result, a supply communication path RB1 and a supply communication path RB2 are defined by the case 660, the flow path formation substrate 642, and the protective substrate 641 on an outer peripheral portion of the flow path formation substrate 642. Here, when it is not necessary to distinguish between the supply communication path RB1 and the supply communication path RB2, the supply communication paths may be simply referred to as a supply communication path RB.

In addition, a compliance substrate 620 is provided on the surface of the communication plate 630 where the supply communication path RA and the coupling communication path RX are opened. The compliance substrate 620 seals the openings of the supply communication path RA and the coupling communication path RX. Such a compliance substrate 620 includes a sealing film 621 and a fixed substrate 622. The sealing film 621 is formed of a flexible thin film or the like, and the fixed substrate 622 is formed of a hard material such as a metal such as stainless steel.

The case 660 is provided with an introduction path 661 for supplying ink to the manifold MN. In addition, the case 660 is an opening that communicates with the through-hole 643 of the protective substrate 641 and penetrates along the Z1 direction, and is provided with a coupling port 662 through which the wiring member 388 is inserted.

The wiring member 388 is a flexible member for electrically coupling the discharge module 23 and the head substrate 35, and for example, an FPC can be used. In addition, an integrated circuit 201 is mounted on the wiring member 388 by chip on film (COF). At least a part of the drive signal selection circuit 200 described above is mounted on the integrated circuit 201.

In the discharge module 23 configured as described above, the drive signal VOUT output by the drive signal selection circuit 200 and the reference voltage signal VBS are supplied to the piezoelectric element 60 via the wiring member 388. The piezoelectric element 60 is driven by a change in the potential difference between the drive signal VOUT and the reference voltage signal VBS. With the driving of the piezoelectric element 60, the diaphragm 610 is displaced in the vertical direction, and the internal pressure of the pressure chamber CB changes. Due to the change in the internal pressure of the pressure chamber CB, the ink stored inside the pressure chamber CB is discharged from the corresponding nozzle N. Here, in the discharge module 23, the configuration including the nozzle N, the nozzle communication path RR, the pressure chamber CB, the piezoelectric element 60, and the diaphragm 610 corresponds to the discharge portion 600 described above.

Returning to FIG. 9, the fixing plate 39 is located on the −Z1 side of the discharge module 23. The fixing plate 39 fixes the six discharge modules 23. Specifically, the fixing plate 39 includes six opening portions 391 penetrating the fixing plate 39 along the Z2 direction. The liquid ejection surface 623*a* of the discharge module 23 is exposed from each of the six opening portions 391. That is, the six discharge modules 23 are fixed to the fixing plate 39 so that the liquid ejection surface 623*a* is exposed from each of the corresponding opening portions 391.

The distribution flow path 37 is located on the +Z1 side of the discharge module 23. Four introduction portions 373 are provided on the surface of the distribution flow path 37 on the +Z1 side. The four introduction portions 373 are flow path tubes that protrude from the surface of the distribution flow path 37 on the +Z1 side toward the +Z1 side along the Z1 direction, and communicate with a flow path hole (not illustrated) formed on the surface of the flow path structure 34 on the −Z1 side. In addition, a flow path tube (not illustrated) that communicates with the four introduction portions 373 is located on the surface of the distribution flow path 37 on the −Z1 side. The flow path tube (not illustrated) located on the surface of the distribution flow path 37 on the −Z1 side communicates with the introduction path 661 included in each of the six discharge modules 23. In addition, the distribution flow path 37 includes six opening portions 371 penetrating along the Z1 direction. The wiring member 388 included in each of the six discharge modules 23 is inserted into the six opening portions 371.

The head substrate 35 is located on the +Z1 side of the distribution flow path 37. A wiring member FC electrically coupled to the aggregate substrate 33 described later is attached to the head substrate 35. In addition, the head substrate 35 is formed with four opening portions 351 and cutout portions 352 and 353. The wiring member 388 included in the discharge modules 23-2 to 23-5 is inserted into the four opening portions 351. The wiring member 388 of each of the discharge modules 23-2 to 23-5 through which the four opening portions 351 are inserted is electrically coupled to the head substrate 35 by solder or the like. In addition, the wiring member 388 included in the discharge module 23-1 passes through the cutout portion 352, and the wiring member 388 included in the discharge module 23-6 passes through the cutout portion 353. The wiring member 388 included in each of the discharge modules 23-1 and 23-6 that have passed through each of the cutout portions 352 and 353 is electrically coupled to the head substrate 35 by solder or the like.

In addition, four cutout portions 355 are formed at the four corners of the head substrate 35. The introduction portion 373 passes through the four cutout portions 355. The four introduction portions 373 that have passed through the cutout portion 355 are coupled to the flow path structure 34 located on the +Z1 side of the head substrate 35.

The flow path structure 34 includes a flow path plate Su1 and a flow path plate Su2. The flow path plate Su1 and the flow path plate Su2 are laminated along the Z1 direction in a state where the flow path plate Su1 is located on the +Z1 side and the flow path plate Su2 is located on the −Z1 side, and are bonded to each other by an adhesive or the like.

The flow path structure 34 includes four introduction portions 341 protruding toward the +Z1 side along the Z1 direction on the surface on the +Z1 side. The four introduction portions 341 communicate with the flow path hole (not illustrated) formed on the surface of the flow path structure 34 on the −Z1 side via the ink flow path formed inside the flow path structure 34. The flow path hole (not illustrated) formed on the surface of the flow path structure 34 on the −Z1 side and the four introduction portions 373 communicate with each other. In addition, the flow path structure 34 is formed with a through-hole 343 penetrating along the Z1 direction. The wiring member FC that is electrically coupled to the head substrate 35 is inserted into the through-hole 343. In addition, inside the flow path structure 34, in addition to the ink flow path that communicates with the introduction portion 341 and the flow path hole (not illustrated) formed on the surface on the −Z1 side, a filter or the like for capturing foreign matter contained in the ink flowing through the ink flow path may be provided.

The housing 31 is located so as to cover the periphery of the flow path structure 34, the head substrate 35, the distribution flow path 37, and the fixing plate 39, and supports the flow path structure 34, the head substrate 35, the distribution flow path 37, and the fixing plate 39. The housing 31 includes four opening portions 311, an aggregate substrate insertion portion 313, and a holding member 315.

The four introduction portions 341 included in the flow path structure 34 are inserted into the four opening portions 311. Ink is supplied from the liquid container 3 to the four introduction portions 341 through which the four opening portions 311 are inserted through a tube (not illustrated) or the like.

The holding member 315 interposes the aggregate substrate 33 in a state where a part of the aggregate substrate 33 is inserted through the aggregate substrate insertion portion 313. The aggregate substrate 33 is provided with a coupling portion 330. Various signals such as a data signal DATA, drive signals COMA, COMB, and COMC, a reference voltage signal VBS, and other power supply voltages output by the head drive module 10 are input to the coupling portion 330 via the wiring member 30. In addition, the wiring member FC included in the head substrate 35 is electrically coupled to the aggregate substrate 33. As a result, the aggregate substrate 33 and the head substrate 35 are electrically coupled to each other. The aggregate substrate 33 may be provided with a semiconductor device including the above-described restoration circuit 220. Although FIG. 8 illustrates a case where the aggregate substrate 33 includes one coupling portion 330, when the liquid discharge device 1 includes a plurality of wiring members 30, and various signals such as a data signal DATA, drive signals COMA, COMB, and COMC, a reference voltage signal VBS, and other power supply voltages output by the head drive module 10 are input to the aggregate substrate 33 via the plurality of wiring members 30, the aggregate substrate 33 may include a plurality of coupling portions 330 corresponding to each of the plurality of wiring members 30.

In the liquid discharge module 20 configured as described above, the liquid container 3 and the introduction portion 341 communicate with each other via a tube or the like (not illustrated) to supply the ink stored in the liquid container 3. The ink supplied to the liquid discharge module 20 is guided to a flow path hole (not illustrated) formed on the surface of the flow path structure 34 on the −Z1 side via the ink flow path formed inside the flow path structure 34, and then is supplied to the four introduction portions 373 included in the distribution flow path 37. The ink supplied to the distribution flow path 37 via the four introduction portions 373 is distributed correspondingly to each of the six discharge modules 23 in an ink flow path (not illustrated) formed inside the distribution flow path 37, and then supplied to the introduction path 661 included in the corresponding discharge module 23. The ink supplied to the discharge module 23 via the introduction path 661 is stored in the pressure chamber CB included in the discharge portion 600.

In addition, the head drive module 10 and the liquid discharge module 20 are electrically coupled to each other by one or a plurality of wiring members 30. As a result, various signals including the drive signals COMA, COMB, and COMC, the reference voltage signal VBS, and the data signal DATA output by the head drive module 10 are supplied to the liquid discharge module 20. Various signals including the drive signals COMA, COMB, and COMC, the reference voltage signal VBS, and the data signal DATA input to the liquid discharge module 20 propagate through the aggregate substrate 33 and the head substrate 35. At this time, the restoration circuit 220 generates clock signals SCK1 to SCK6, print data signals SI1 to SI6, and latch signals LAT1 to LAT6 corresponding to each of the discharge modules 23-1 to 23-6 from the data signal DATA. The integrated circuit 201 including the drive signal selection circuit 200 provided in the wiring member 388 generates drive signals VOUT corresponding to each of the n discharge portions 600, and supplies the drive signals VOUT to the piezoelectric element 60 included in the corresponding discharge portion 600. As a result, the piezoelectric element 60 is driven, and the ink stored in the pressure chamber CB is discharged.

1.4 Head Drive Module Structure

Figure 11:
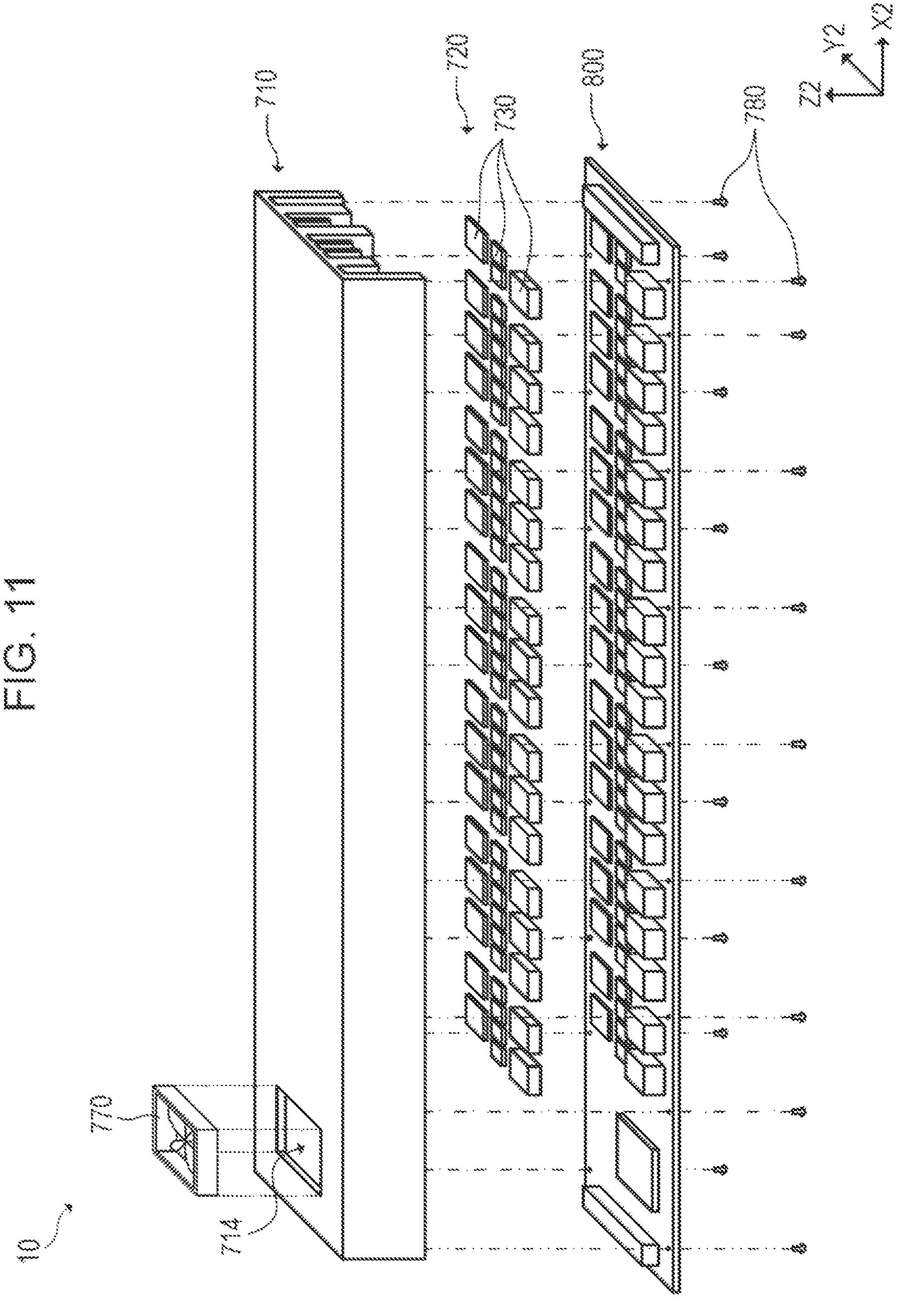
FIG. 11 is a diagram illustrating an example of a structure of a head drive module.
Figure 12:
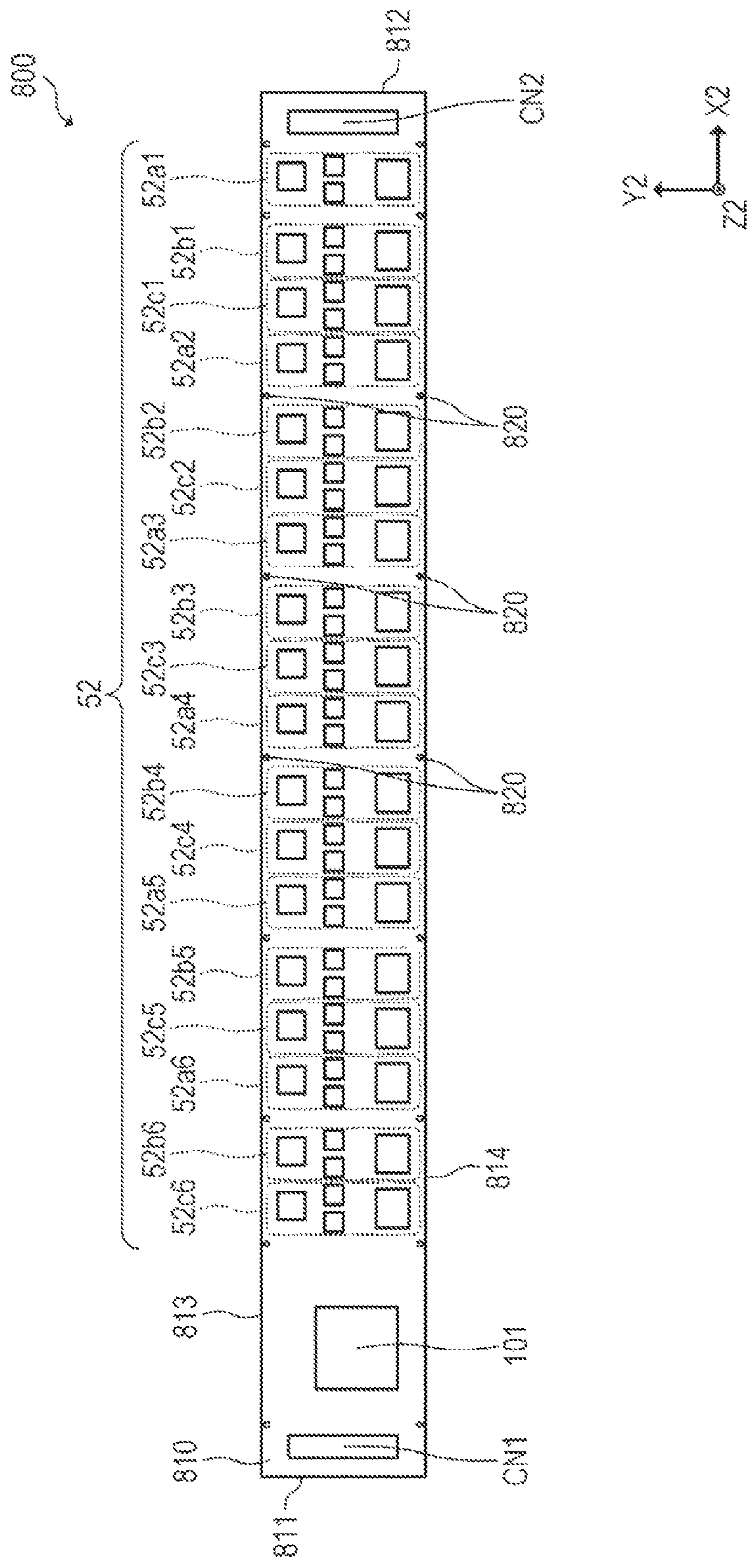
FIG. 12 is a diagram illustrating an example of a structure of a drive circuit substrate.

Next, the structure of the head drive module 10 will be described with reference to FIGS. 11 to 12. Here, FIGS. 11 to 12 illustrate arrows indicating the X2 direction, the Y2 direction, and the Z2 direction which are independent of the above-described X1 direction, Y1 direction, and Z1 direction and are orthogonal to each other. In addition, in the description of FIGS. 11 to 12, the starting point side of the arrow indicating the X2 direction may be referred to as a −X2 side, the tip end side may be referred to as a +X2 side, the starting point side of the arrow indicating the Y2 direction may be referred to as a −Y2 side, the tip end side may be referred to as a +Y2 side, the starting point side of the arrow indicating the Z2 direction may be referred to as a −Z2 side, and the tip end side may be referred to as a +Z2 side.

FIG. 11 is a diagram illustrating an example of the structure of the head drive module 10. As illustrated in FIG. 11, the head drive module 10 includes a drive circuit substrate 800 including a plurality of drive circuits 52, a heat sink 710, a heat conductive member group 720, a plurality of screws 780, and a cooling fan 770. In the head drive module 10, the drive circuit substrate 800 and the heat sink 710 are provided in the order of the drive circuit substrate 800 and the heat sink 710 along the Z2 direction, the heat conductive member group 720 is located between the drive circuit substrate 800 and the heat sink 710, and the heat sink 710 is attached to the drive circuit substrate 800 by a plurality of screws 780. As a result, the heat conductive member group 720 is interposed between the drive circuit substrate 800 and the heat sink 710, and the heat generated in the drive circuit substrate 800 is conducted to the heat sink 710 via the heat conductive member group 720. As a result, the heat generated in the drive circuit substrate 800 is released to the outside of the head drive module 10.

An example of the structure of the drive circuit substrate 800 will be described. FIG. 12 is a diagram illustrating an example of the structure of the drive circuit substrate 800. As illustrated in FIG. 12, the drive circuit substrate 800 includes a wiring substrate 810, drive circuits **52*a*1 to 52*a*6, 52*b*1 to 52*b*6, 52*c*1 to 52*c*6 as a plurality of drive circuits 52, coupling portions CN1 and CN2, and an integrated circuit 101**.

The wiring substrate 810 has a substantially shape including sides 811 and 812 facing each other along the X2 direction and sides 813 and 814 facing each other along the Y2 direction. Specifically, the side 811 is located on the −X2 side of the wiring substrate 810, and the side 812 is located on the +X2 side of the wiring substrate 810. The side 813 intersects the sides 811 and 812 and is located on the +Y2 side of the wiring substrate 810. The side 814 intersects the sides 811 and 812 and is located on the −Y2 side of the wiring substrate 810. In addition, a plurality of through-holes 820 are formed in the wiring substrate 810. Some of the plurality of through-holes 820 are arranged side by side along the side 813 of the wiring substrate 810, and some of the different through-holes 820 are arranged side by side along the side 814 of the wiring substrate 810. That is, the plurality of through-holes 820 are formed in two rows along the X2 direction on the wiring substrate 810.

The coupling portion CN1 is located along the side 811 of the wiring substrate 810. A cable (not illustrated) electrically coupled to the control unit 2 is attached to the coupling portion CN1. As a result, a signal including the image information signal IP output by the control unit 2 is supplied to the head drive module 10. Here, the head drive module 10 and the control unit 2 may be coupled by, for example, a universal serial bus (USB) cable or a high-definition multimedia interface (HDMI: registered trademark) cable. In this case, as the coupling portion CN1, a USB connector or an HDMI (registered trademark) connector depending on the type of cable to be coupled is used. In addition, the head drive module 10 and the control unit 2 may be directly electrically coupled to each other without a cable. As the coupling portion CN1 in this case, for example, a B to B (Board to Board) connector can be used.

The coupling portion CN2 is located along the side 812 of the wiring substrate 810. One end of the wiring member 30 is attached to the coupling portion CN2. In addition, the other end of the wiring member 30 is coupled to the coupling portion 330 included in the liquid discharge module 20. That is, the signals including the drive signals COMA1 to COMA6, COMB1 to COMB6, and COMC1 to COMC6 and the data signal DATA output by the head drive module 10 are supplied to the liquid discharge module 20 via the coupling portion CN2 and the wiring member 30. The details of the wiring member 30 that electrically couples the head drive module 10 and the liquid discharge module 20 will be described later.

The integrated circuit 101 is located on the +X2 side of the coupling portion CN1. The integrated circuit 101 constitutes a part or all of the control circuit 100, and outputs various signals based on the image information signal IP input via the coupling portion CN1. In addition, the integrated circuit 101 may include a part or all of the conversion circuit 120 in addition to the control circuit 100. The integrated circuit 101 in the present embodiment will be described as including the entire control circuit 100 and the entire conversion circuit 120, but the present disclosure is not limited thereto.

The plurality of drive circuits 52 are located side by side in the X2 direction between the integrated circuit 101 and the coupling portion CN2.

Specifically, the drive circuits 52*a*1 to 52*a*6, 52*b*1 to 52*b*6, 52*c*1 to 52*c*6 as the plurality of drive circuits 52 are located side by side between the integrated circuit 101 and the coupling portion CN2 from the side 811 to the side 812 in the order of the drive circuits 52*c*6, 52*b*6, 52*a*6, 52*c*5, 52*b*5, 52*a*5, 52*c*4, 52*b*4, 52*a*4, 52*c*3, 52*b*3, 52*a*3, 52*c*2, 52*b*2, 52*a*2, 52*c*1, 52*b*1, 52*a*1.

In the drive circuit substrate 800 configured as described above, the image information signal IP input via the coupling portion CN1 is supplied to the integrated circuit 101. The integrated circuit 101 generates and outputs the basic drive signals dA1 to dA6, dB1 to dB6, dC1 to dC6, and data signal DATA based on the image information signal IP by the control circuit 100 and the conversion circuit 120 included in the integrated circuit 101. The basic drive signals dA1 to dA6, dB1 to dB6, and dC1 to dC6 propagate through a wiring pattern (not illustrated) included in the wiring substrate 810 and are input to the corresponding drive circuit 52. The drive circuit 52 generates and outputs the corresponding drive signals COMA1 to COMA6, COMB1 to COMB6, COMC1 to COMC6 based on the input basic drive signals dA1 to dA6, dB1 to dB6, dC1 to dC6. The drive signals COMA1 to COMA6, COMB1 to COMB6, COMC1 to COMC6 output from the plurality of drive circuits 52 propagate through a wiring pattern (not illustrated), a coupling portion CN2, and a wiring member 30 included in the wiring substrate 810, and are supplied to the liquid discharge module 20.

Here, FIG. 12 illustrates a case where the integrated circuit 101 is mounted on the wiring substrate 810 together with the plurality of drive circuits 52, but the integrated circuit 101 may be mounted on a substrate (not illustrated) different from the drive circuit 52. As illustrated in FIG. 12, when the integrated circuit 101 is mounted on a substrate common to the plurality of drive circuits 52, it is possible to shorten the wiring length in which the signal is propagated between the plurality of drive circuits 52 and the integrated circuit 101. As a result, the possibility that noise or the like is superimposed on the signal propagating between the plurality of drive circuits 52 and the integrated circuit 101 is reduced. On the other hand, the plurality of drive circuits 52 generate a large amount of heat as compared with the integrated circuit 101. Therefore, there is a possibility that the stability of the operation of the integrated circuit 101 may decrease due to the heat generated in the plurality of drive circuits 52. In response to such a problem, by mounting the integrated circuit 101 on a substrate different from the plurality of drive circuits 52, it is possible to reduce the possibility that the heat generated by the plurality of drive circuits 52 contributes to the integrated circuit 101, and the possibility that the stability of the operation of the integrated circuit 101 is decreased is reduced.

Returning to FIG. 11, in the head drive module 10, the heat sink 710 is located on the +Z2 side of the drive circuit substrate 800. The heat sink 710 releases the heat generated in the drive circuit substrate 800 by conducting the heat. As a result, the possibility that the temperature of the drive circuit substrate 800 rises is reduced, and the stability of the operation of various circuits included in the drive circuit substrate 800 is improved. Such a heat sink 710 is a metal substance having high thermal conductivity and is configured to contain, for example, aluminum, iron, copper, and the like, from the viewpoint of efficiently releasing the heat generated in the drive circuit substrate 800.

The plurality of screws 780 fix the heat sink 710 to the drive circuit substrate 800. Specifically, each of the plurality of screws 780 is inserted through a plurality of through-holes 820 formed in the wiring substrate 810 from the −Z2 side toward the +Z2 side, and is fastened to the heat sink 710 located on the +Z2 side of the drive circuit substrate 800 to attach the heat sink 710 to the drive circuit substrate 800.

Here, for example, rivets may be used for the plurality of screws 780, as long as the heat sink 710 can be fixed to the drive circuit substrate 800. In addition, the head drive module 10 does not include the plurality of screws 780, a part of the heat sink 710 may insert the through-hole 820, and a part of the heat sink 710 through which the through-hole 820 is inserted may be attached to a metal portion of the drive circuit substrate 800 by soldering or the like.

The heat conductive member group 720 includes a plurality of heat conductive members 730. The heat conductive member group 720 is located between the drive circuit substrate 800 and the heat sink 710 in the Z2 direction, and is interposed between the drive circuit substrate 800 and the heat sink 710. The heat conductive member group 720 conducts the heat generated in the drive circuit substrate 800 to the heat sink 710.

Such a plurality of heat conductive members 730 are provided corresponding to the electronic component included in the drive circuit 52, which generates a particularly large amount of heat. Specifically, when the drive circuit 52 includes, for example, a class D amplifier circuit, some of the plurality of heat conductive members 730 are provided corresponding to the semiconductor device that outputs the gate drive signal for driving a pair of transistors based on the basic drive signals dA1 to dA6, dB1 to dB6, and dC1 to dC6. Some of the different heat conductive members 730 are provided corresponding to a pair of transistors that operate based on a gate drive signal to output an amplified signal based on the basic drive signals dA1 to dA6, dB1 to dB6, and dC1 to dC6. Some of the further different heat conductive members 730 are provided corresponding to the inductor elements that generate and output the drive signals COMA1 to COMA6, COMB1 to COMB6, and COMC1 to COMC6 by smoothing the amplified signal output by a pair of transistors.

Such a plurality of heat conductive members 730 is a substance having flame retardancy and electrical insulation in addition to elasticity, and for example, a gel sheet or a rubber sheet containing silicone or acrylic resin and having thermal conductivity can be used.

In the head drive module 10 configured as described above, due to various tolerances including an error in attaching the heat sink 710 to the wiring substrate 810, errors caused by mounting variations of various electronic components included in the drive circuit 52, and dimensional errors of various electronic components included in the heat sink 710 and the drive circuit 52, even when the heat sink 710 is attached to the wiring substrate 810, the contact state between the heat sink 710 and the drive circuit substrate 800 varies. As a result, there is a possibility that the conduction efficiency of the heat generated in the drive circuit substrate 800 in the heat sink 710 may decrease, and the heat may not be sufficiently released by the heat sink 710.

In addition, considering that the heat sink 710 is fastened to the drive circuit substrate 800 by the plurality of screws 780, due to the tightening torque of the plurality of screws 780 when attached to the drive circuit substrate 800 and the various tolerances described above, unintended stress is applied to various electronic components mounted on the drive circuit substrate 800. As a result, there is a possibility that the head drive module 10 may malfunction.

In response to such a problem, since the heat conductive member group 720 has elasticity, the variation in the contact state between the heat sink 710 and various electronic components is reduced, and the possibility that unintended stress is applied to various electronic components mounted on the wiring substrate 810 is reduced. As a result, the stability of the operation of the head drive module 10 is improved.

Furthermore, as described above, the heat sink 710 is a substance having high thermal conductivity, and a metal such as aluminum or iron is used. Therefore, when the heat sink 710 and various electronic components mounted on the wiring substrate 810 are in electrical contact with each other, there is a possibility that the drive circuit substrate 800 may malfunction. In response to such a problem, since the heat conductive member group 720 has flame retardancy and electrical insulation, the possibility that the heat sink 710 and various electronic components mounted on the wiring substrate 810 are in electrical contact with each other is reduced. As a result, the stability of the operation of the head drive module 10 is improved.

The cooling fan 770 is located on the −Z2 side of the heat sink 710. The heat sink 710 introduces the outside air into the head drive module 10 through an opening portion 714 provided in the upper portion on the −X2 side.

Specifically, the opening portion 714 is a through-hole that penetrates the heat sink 710 along the Z2 direction, and functions as an opening that communicates with the inside of the head drive module 10 when the heat sink 710 is attached to the drive circuit substrate 800. The cooling fan 770 is attached so as to cover the opening portion 714. By operating the cooling fan 770, the outside air is introduced into the inside of the head drive module 10 through the opening portion 714. As a result, the circulation efficiency of the air floating inside the head drive module 10 is improved, and as a result, the release efficiency of heat generated in the drive circuit substrate 800 by the heat sink 710 is further improved.

Here, the cooling fan 770 may be attached so as to increase the circulation efficiency of the air floating inside the head drive module 10, and may be located on any one of the +X2 side, the −X2 side, the +Y2 side, and the −Y2 side of the head drive module 10. In addition, the head drive module 10 may include a plurality of the cooling fans 770. In addition, the operation of the cooling fan 770 so as to introduce the outside air into the inside of the head drive module 10 is not limited to the operation of the cooling fan 770 so that the outside air is taken into the inside of the head drive module 10 via the cooling fan 770, and also includes the operation of the cooling fan 770 so as to exhaust the air floating inside the head drive module 10 via the cooling fan 770.

1.5 Structure of Wiring Member

Next, the structure of the wiring member 30 that electrically couples the head drive module 10 and the liquid discharge module 20 will be described with reference to FIGS. 13 to 16. In the following description, among the wiring members 30 that electrically couples the head drive module 10 and the liquid discharge module 20, the structure of the wiring member 30 that propagates the high voltage drive signals COMA1 to COMA6, COMB1 to COMB6, and COMC1 to COMC6 and the reference voltage signals VBS1 to VBS6 corresponding to each of the drive signals COMA1 to COMA6, COMB1 to COMB6, and COMC1 to COMC6 will be described.

Figure 13:
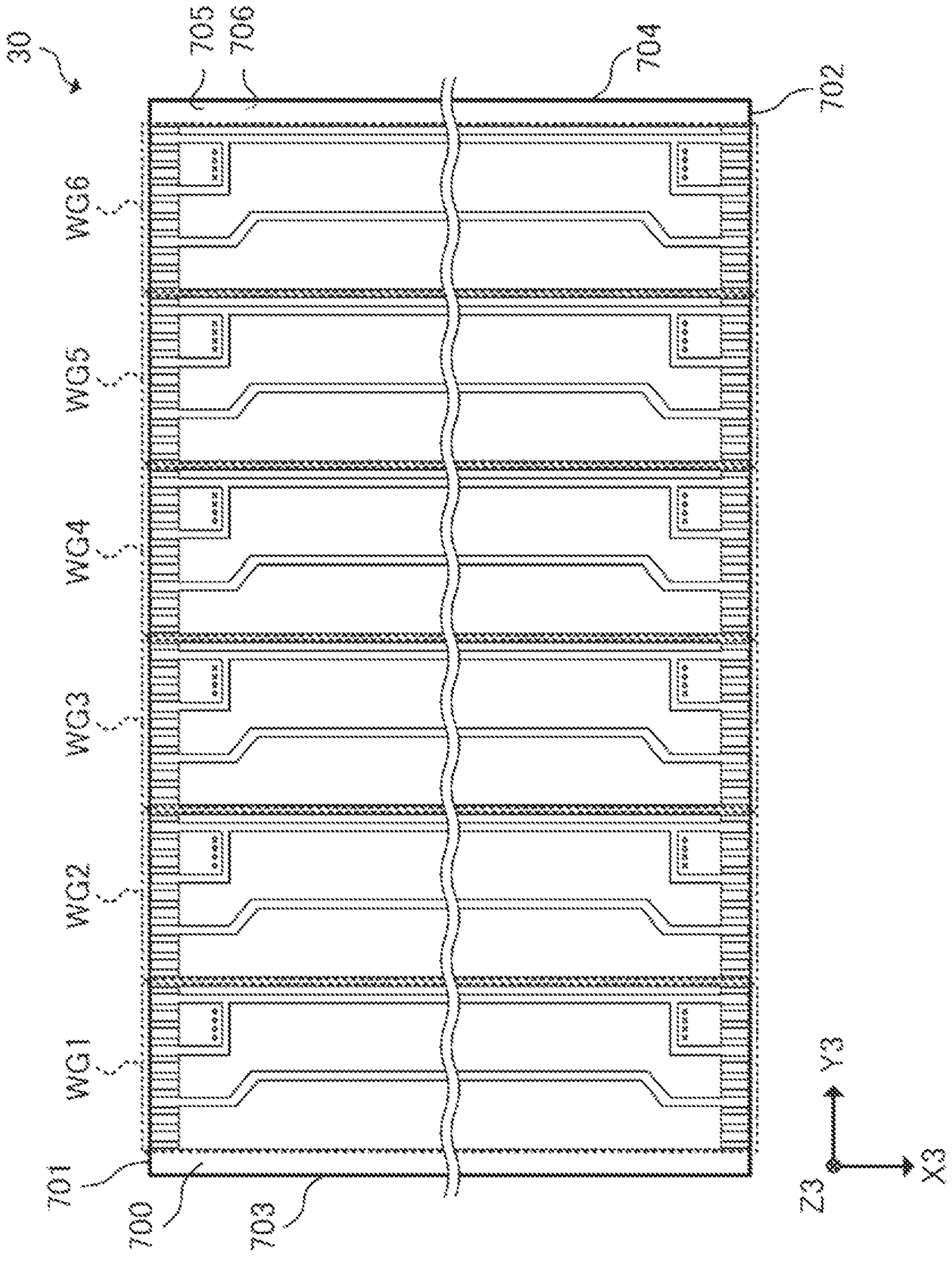
FIG. 13 is a diagram illustrating an example of a structure of a wiring member.

FIG. 13 is a diagram illustrating an example of the structure of the wiring member 30. As illustrated in FIG. 13, the wiring member 30 includes a base material 700 and wiring groups WG1 to WG6 provided on the base material 700.

The base material 700 is configured to contain a flexible substance such as a plastic film, polyimide, or PET in order to realize the flexibility of the wiring member 30. Such a base material 700 has a substantially rectangular shape including sides 701 and 702 facing each other and sides 703 and 704 facing each other, and includes a surface 705 and a surface 706 different from the surface 705. In the liquid discharge device 1 of the first embodiment, the wiring member 30 is described as having a substantially rectangular shape, but the shape of the wiring member 30 is not limited to the rectangular shape.

Specifically, the side 701 and the side 702 are located facing each other, and the side 703 and the side 704 are located facing each other. The side 701 intersects the side 703 and the side 704, and the side 702 intersects the side 703 and the side 704. In this case, one plane of the planes including the sides 701, 702, 703, and 704 is the surface 705, and the other plane of the planes including the sides 701, 702, 703, and 704 is the surface 706.

In addition, FIG. 13 illustrates the X3 direction, Y3 direction, and Z3 direction that intersect each other. The X3 direction, the Y3 direction, and the Z3 direction are directions independent of the X1 direction, the Y1 direction, the Z1 direction, the X2 direction, the Y2 direction, and the Z2 direction described above. Specifically, the X3 direction is a direction along the direction from the side 701 to the side 702 along the base material 700. The Y3 direction is a direction along the direction from the side 703 to the side 704 along the base material 700. The Z3 direction is a direction along the direction from the surface 705 to the surface 706 along the base material 700.

Here, as described above, the wiring member 30 is a flexible member such as an FPC, and is curved or bent to electrically couple the head drive module 10 and the liquid discharge module 20 to each other. Therefore, when the wiring member 30 is curved or bent, the direction from the side 701 to the side 702 of the base material 700 along the wiring member 30 and the direction from the side 703 to the side 704 of the base material 700 along the wiring member 30 are also curved and bent. That is, in FIG. 13, although each of the X3 direction, the Y3 direction, and the Z3 direction is illustrated as a linear direction, the X3 direction, the Y3 direction, and the Z3 direction are not limited to the linear direction, and may be curved or bent directions as the wiring member 30 is curved or bent. In the following description, the starting point side of the arrow indicating the X3 direction may be referred to as a −X3 side, the tip end side may be referred to as a +X3 side, the starting point side of the arrow indicating the Y3 direction may be referred to as a −Y3 side, the tip end side may be referred to as a +Y3 side, the starting point side of the arrow indicating the Z3 direction may be referred to as a −Z3 side, and the tip end side may be referred to as a +Z3 side.

The wiring groups WG1 to WG6 are provided corresponding to each of the discharge modules 23-1 to 23-6, and include a plurality of wirings that propagates signals supplied to each of the discharge modules 23-1 to 23-6. Specifically, the wiring group WG1 includes wiring that propagates each of the drive signals COMA1, COMB1, and COMC1 corresponding to the discharge module 23-1, and wiring that propagates the reference voltage signal VBS1. In addition, the wiring group WG2 is located on the +Y3 side of the wiring group WG1 and includes a wiring that propagates each of the drive signals COMA2, COMB2, and COMC2 corresponding to the discharge module 23-2 and a wiring that propagates the reference voltage signal VBS2. In addition, the wiring group WG3 is located on the +Y3 side of the wiring group WG2, and includes a wiring that propagates each of the drive signals COMA3, COMB3, and COMC3 corresponding to the discharge module 23-3 and a wiring that propagates the reference voltage signal VBS3. In addition, the wiring group WG4 is located on the +Y3 side of the wiring group WG3, and includes a wiring that propagates each of the drive signals COMA4, COMB4, and COMC4 corresponding to the discharge module 23-4 and a wiring that propagates the reference voltage signal VBS4. In addition, the wiring group WG5 is located on the +Y3 side of the wiring group WG4, and includes a wiring that propagates each of the drive signals COMA5, COMB5, and COMC5 corresponding to the discharge modules 23-5, and a wiring that propagates the reference voltage signal VBS5. In addition, the wiring group WG6 is located on the +Y3 side of the wiring group WG5, and includes a wiring that propagates each of the drive signals COMA6, COMB6, and COMC6 corresponding to the discharge modules 23-6 and a wiring that propagates the reference voltage signal VBS6.

That is, the wiring groups WG1 to WG6 are located side by side in the order of the wiring group WG1, the wiring group WG2, the wiring group WG3, the wiring group WG4, the wiring group WG5, and the wiring group WG6 from the −Y3 side to the +Y3 side, in the direction from the side 703 to the side 704 of the base material 700 and in the direction along the Y3 direction.

In the wiring member 30 configured as described above, an end portion of the base material 700 on the side 701 side as one end is attached to the coupling portion CN2 of the head drive module 10, and an end portion of the base material 700 on the side 702 side as the other end is attached to the coupling portion 330 of the liquid discharge module 20. As a result, the head drive module 10 and the liquid discharge module 20 are electrically coupled to each other via the wiring member 30.

Next, an example of the configuration of the wiring groups WG1 to WG6 will be described. In the liquid discharge device 1 of the first embodiment, the wiring groups WG1 to WG6 provided on the base material 700 included in the wiring member 30 differ only in the propagating signals, and all have the same configuration. Therefore, in the following description, only the configuration of the wiring group WG1 corresponding to the discharge module 23-1 will be described, and the description of each configuration of the wiring groups WG2 to WG6 corresponding to each of the discharge modules 23-2 to 23-6 will be omitted.

Figure 14:
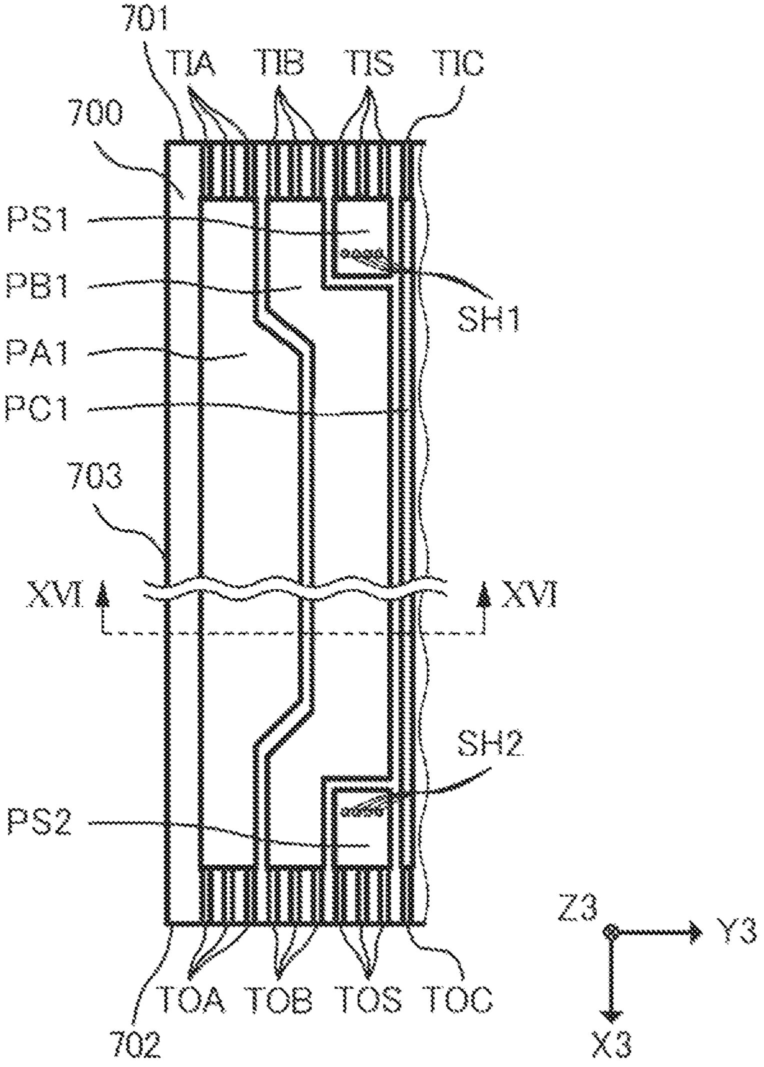
FIG. 14 is a diagram illustrating an example of wiring provided on a surface of a base material.
Figure 15:
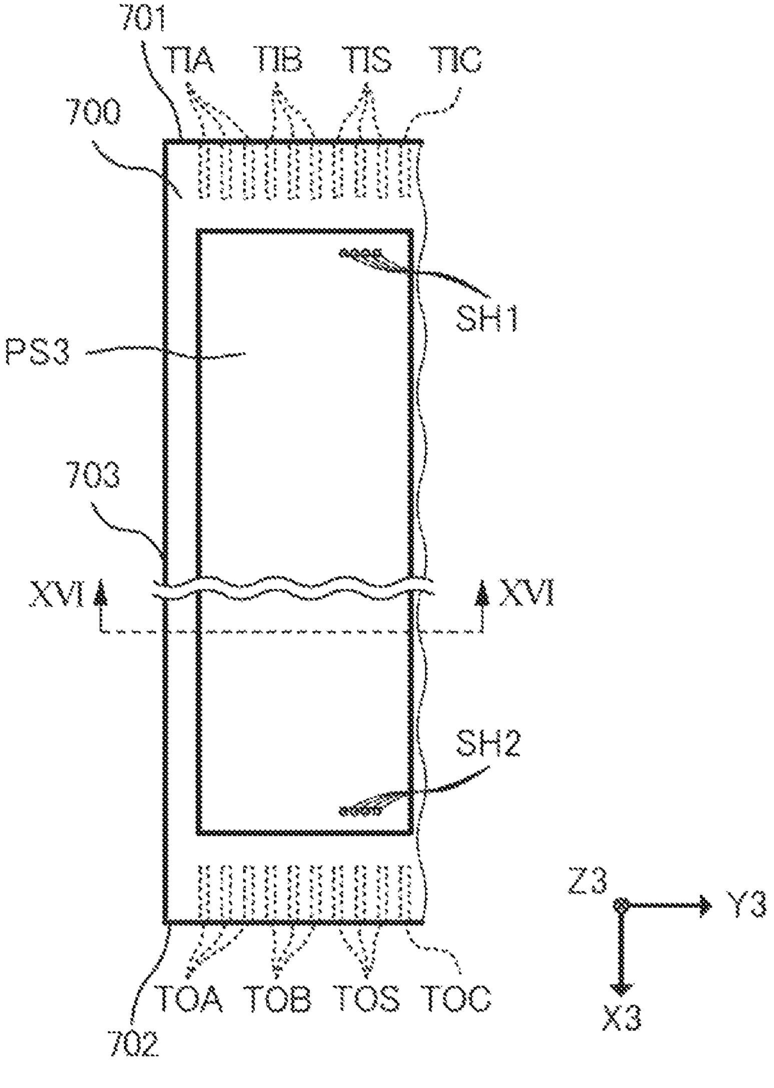
FIG. 15 is a diagram illustrating an example of wiring provided on a surface of the base material.

FIG. 14 is a diagram illustrating an example of wiring provided on the surface 705 of the base material 700 in the wiring group WG1. FIG. 15 is a diagram illustrating an example of wiring provided on the surface 706 of the base material 700 in the wiring group WG1. FIGS. 14 and 15 illustrate the X3 direction, the Y3 direction, and the Z3 direction, which indicate the same directions as those in FIG. 13. Here, FIGS. 14 and 15 are diagrams of the wiring member 30 viewed from the +Z3 side toward the −Z3 side. That is, FIG. 14 is a plan view illustrating an example of the configuration of the surface 705 of the base material 700 in the wiring group WG1. FIG. 15 is a perspective view illustrating an example of the configuration of the surface 706 of the base material 700 in the wiring group WG1. In addition, in FIG. 15, a part of the configuration provided on the surface 705 is illustrated by a broken line.

As illustrated in FIGS. 14 and 15, the wiring group WG1 includes terminals TIA, TIB, TIC, and TIS, terminals TOA, TOB, TOC, and TOS, wiring patterns PA1, PB1, PC1, PS1, PS2, and PS3, and through-holes SH1 and SH2.

The terminals TIA, TIB, TIC, and TIS are located side by side in the order of terminals TIA, TIB, TIS, and TIC along the side 701 on the surface 705 of the base material 700. When the wiring member 30 is attached to the coupling portion CN2, each of the terminals TIA, TIB, TIC, and TIS comes into contact with the electrodes (not illustrated) of the coupling portion CN2. As a result, the wiring member 30 and the coupling portion CN2 are electrically coupled to each other. Here, although FIGS. 14 and 15 illustrate a case where the wiring member 30 includes three terminals TIA, three terminals TIB, three terminals TIS, and one terminal TIC, the number of terminals TIA, TIB, TIS, and TIC included in the wiring member 30 is not limited thereto, and may be appropriately changed depending on the amount of current generated by the propagation of the signal and the like.

The terminals TOA, TOB, TOC, and TOS are located side by side in the order of terminals TOA, TOB, TOS, and TOC along the side 702 on the surface 705 of the base material 700. When the wiring member 30 is attached to the coupling portion 330, each of the terminals TOA, TOB, TOC, and TOS comes into contact with the electrodes (not illustrated) of the coupling portion 330. As a result, the wiring member 30 and the coupling portion 330 are electrically coupled to each other. Here, although FIGS. 14 and 15 illustrate a case where the wiring member 30 includes three terminals TOA, three terminals TOB, three terminals TOS, and one terminal TOC, the number of terminals TOA, TOB, TOS, and TOC included in the wiring member 30 is not limited thereto, and may be appropriately changed depending on the amount of current generated by the propagation of the signal and the like.

The wiring pattern PA1 is provided on the surface 705 and electrically couples the three terminals TIA and the three terminals TOA. As a result, the signal input from the head drive module 10 to the three terminals TIA via the coupling portion CN2 propagates through the wiring pattern PA1, and is supplied to the coupling portion 330 of the liquid discharge module 20 via the three terminals TOA.

The wiring pattern PB1 is provided on the +Y3 side of the wiring pattern PA1 on the surface 705, and electrically couples the three terminals TIB and the three terminals TOB. As a result, the signal input from the head drive module 10 to the three terminals TIB via the coupling portion CN2 propagates through the wiring pattern PB1 and is supplied to the coupling portion 330 of the liquid discharge module 20 via the three terminals TOB.

The wiring pattern PC1 is provided on the +Y3 side of the wiring pattern PB1 on the surface 705, and electrically couples one terminal TIC and one terminal TOC. As a result, the signal input from the head drive module 10 to the one terminal TIC via the coupling portion CN2 propagates through the wiring pattern PC1 and is supplied to the coupling portion 330 of the liquid discharge module 20 via the one terminal TOC.

The wiring pattern PS1 is located between the wiring pattern PB1 and the wiring pattern PC1 on the surface 705, and electrically couples the three terminals TIS and the through-hole SH1. The through-hole SH1 penetrates the base material 700 along the Z3 direction, and electrically couples the wiring pattern PS1 provided on the surface 705 and the wiring pattern PS3 provided on the surface 706. The wiring pattern PS3 electrically couples the through-hole SH1 and the through-hole SH2 on the surface 706. The through-hole SH2 penetrates the base material 700 along the Z3 direction, and electrically couples the wiring pattern PS3 provided on the surface 706 and the wiring pattern PS2 provided on the surface 705. The wiring pattern PS2 is located between the wiring pattern PB1 and the wiring pattern PC1 on the surface 705, and electrically couples the three terminals TOS and the through-hole SH2. As a result, the signal input from the head drive module 10 to the three terminals TIS via the coupling portion CN2 propagates through the wiring pattern PS1, the through-hole SH1, the wiring pattern PS3, the through-hole SH2, and the wiring pattern PS2, and is supplied to the coupling portion 330 of the liquid discharge module 20 via the three terminals TOS.

In the liquid discharge device 1 of the present embodiment, the drive signal COMA1 output by the head drive module 10 is input to the terminal TIA, propagates through the wiring pattern PA1, and is supplied to the liquid discharge module 20 via the terminal TOA. The drive signal COMB1 is input to the terminal TIB, propagates through the wiring pattern PB1, and is supplied to the liquid discharge module 20 via the terminal TOB. In addition, the drive signal COMC1 having a smaller amount of current generated when propagated than the drive signals COMA1 and COMB1 is input to the terminal TIC, propagates through the wiring pattern PC1, and is supplied to the liquid discharge module 20 via the terminal TOC. The reference voltage signal VBS1 is input to the terminal TIS, propagates through the wiring patterns PS1, PS3, and PS2, and is supplied to the liquid discharge module 20 via the terminal TOS.

That is, the wiring member 30 includes the wiring pattern PA1 that propagates the drive signal COMA1, the wiring pattern PB1 that propagates the drive signal COMB1, the wiring pattern PC1 that propagates the drive signal COMC1, the wiring patterns PS1, PS2, and PS3 that propagates the reference voltage signal VBS1 that is the reference potential for driving the piezoelectric element 60, and the base material 700 provided with the wiring patterns PA1, PB1, PC1, PS1, PS2, and PS3. The wiring patterns PA1, PB1, PC1, PS1, and PS2 are provided on the surface 705 of the base material 700, and the wiring pattern PS3 is provided on the surface 706 different from the surface 705 of the base material 700.

In the wiring member 30 configured as described above, when the base material 700 is viewed from the Z3 direction, which is the direction from the surface 705 to the surface 706, at least one of the wiring pattern PA1 and the wiring pattern PC1 provided on the surface 705 is located so as to overlap with at least a part of the wiring pattern PS3 provided on the surface 706.

Figure 16:
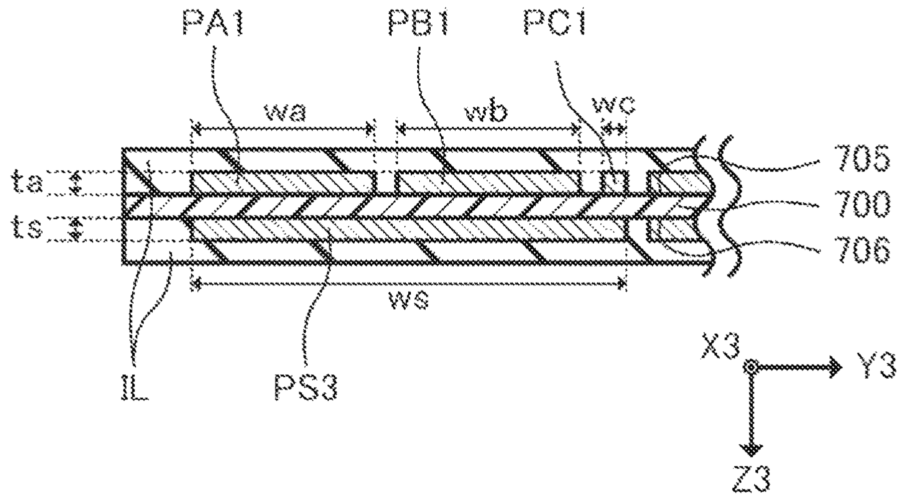
FIG. 16 is a cross-sectional view when the wiring member is cut along the line XVI-XVI illustrated in FIGS. 14 and 15.

A specific example of the configuration of the wiring member 30 will be described with reference to FIG. 16. FIG. 16 is a cross-sectional view when the wiring member 30 is cut along the line XVI-XVI illustrated in FIGS. 14 and 15. As illustrated in FIG. 16, the wiring member 30 includes an insulating layer IL in addition to the above-described base material 700, the wiring pattern PA1 that propagates the drive signal COMA1, the wiring pattern PB1 that propagates the drive signal COMB1, and the wiring pattern PC1 that propagates the drive signal COMC1, which are provided on the surface 705 of the base material 700, and the wiring pattern PS3 that propagates the reference voltage signal VBS1, which is provided on the surface 706 of the base material 700.

The insulating layer IL is a flexible insulator such as a polyimide film, and insulates the wiring patterns PA1, PB1, PC1, and PS3 from each other, and also insulates the wiring patterns PA1, PB1, PC1, and PS3 from the outside of the wiring member 30.

As illustrated in FIG. 16, in the cross section when the wiring member 30 is cut along the XVI-XVI line, the wiring pattern PA1 is a conductor having a width wa along the Y3 direction and a thickness ta along the Z3 direction, and is located on the surface 705 of the base material 700. In addition, in the cross section when the wiring member 30 is cut along the XVI-XVI line, the wiring pattern PB1 is a conductor having a width wb along the Y3 direction and a thickness ta along the Z3 direction, and is located on the +Y3 side of the wiring pattern PA1 on the surface 705 of the base material 700. In addition, in the cross section when the wiring member 30 is cut along the XVI-XVI line, the wiring pattern PC1 is a conductor having a width wc along the Y3 direction and a thickness ta along the Z3 direction, and is located on the +Y3 side of the wiring pattern PB1 on the surface 705 of the base material 700.

In this case, the width wa of the wiring pattern PA1 is wider than the width wc of the wiring pattern PC1, and the width wb of the wiring pattern PB1 is wider than the width wc of the wiring pattern PC1. That is, in the cross section when the wiring member 30 is cut along the XVI-XVI line, the effective cross-sectional area of the wiring pattern PA1 propagated by the drive signal COMA1 is larger than the effective cross-sectional area of the wiring pattern PC1 propagated by the drive signal COMC1. The effective cross-sectional area of the wiring pattern PB1 propagated by the drive signal COMB1 is larger than the effective cross-sectional area of the wiring pattern PC1 propagated by the drive signal COMC1.

As described above, the drive signals COMA1 and COMB1 are signals for driving the piezoelectric element 60 so as to discharge ink, whereas the drive signal COMC1 is a signal for driving the piezoelectric element 60 so as not to discharge ink. Therefore, the amount of current generated when the drive signals COMA1 and COMB1 propagate through the wiring member 30 is larger than the amount of current generated when the drive signal COMC1 propagates through the wiring member 30. The effective cross-sectional area of the wiring pattern PA1 propagated by the drive signal COMA1 is made larger than the effective cross-sectional area of the wiring pattern PC1 propagated by the drive signal COMC1, and the effective cross-sectional area of the wiring pattern PB1 propagated by the drive signal COMB1 is made larger than the effective cross-sectional area of the wiring pattern PC1 propagated by the drive signal COMC1. Therefore, it is possible to reduce the influence of the impedance of the wiring member 30 when the drive signals COMA1, COMB1, and COMC1 propagate through the wiring member 30. As a result, the possibility that the waveforms of the drive signals COMA1, COMB1, and COMC1 are distorted can be reduced, the temperature rise of the wiring member 30 due to the current generated by the propagation of the drive signals COMA1, COMB1, and COMC1 can be reduced, and the reliability of the liquid discharge device 1 is improved.

Here, in FIG. 16, the lengths of the wiring patterns PA1, PB1, and PC1 along the Z3 direction are exemplified as having the same thickness ta. This is because when the wiring patterns PA1, PB1, and PC1 are formed on the surface 705 of the base material 700, the copper foil that is the basis of the wiring patterns PA1, PB1, and PC1 is adhered to the surface 705 of the base material 700 and the wiring patterns PA1, PB1, and PC1 are formed by processing the copper foil into a predetermined pattern by an etching treatment. However, a method of manufacturing the wiring member 30 is not limited to the above-described method. Therefore, the lengths of the wiring patterns PA1, PB1, and PC1 along the Z3 direction may be individually different from each other.

In addition, in the cross section when the wiring member 30 is cut along the XVI-XVI line, the wiring pattern PS3 is a conductor having a width ws along the Y3 direction and a thickness is along the Z3 direction, and is located on the surface 706 of the base material 700. At this time, in the wiring pattern PS3, it is preferable that at least a part of the end portion of the wiring pattern PS3 on the −Y3 side is located so as to overlap with the end portion of the wiring pattern PA1 on the −Y3 side in the direction along the Z3 direction as illustrated in FIG. 16, and at least a part of the end portion of the wiring pattern PS3 on the +Y3 side is located so as to overlap with the end portion of the wiring pattern PC1 on the −Y3 side. That is, the width ws, which is the length along the Y3 direction of the wiring pattern PS3, is wider than the width wa, which is the length along the Y3 direction of the wiring pattern PA1, wider than the width wb, which is the length of the wiring pattern PB1 along the Y3 direction, and wider than the width wc, which is the length of the wiring pattern PC1 along the Y3 direction. As a result, at least a part of the wiring pattern PS3 can be located so as to overlap with the wiring patterns PA1, PB1, and PC1 in the direction along the Z3 direction.

As described above, the drive signal VOUT generated based on the drive signals COMA1, COMB1, and COMC1 is supplied to one end of the piezoelectric element 60 of the liquid discharge module 20, and the reference voltage signal VBS1 is supplied to the other end of the piezoelectric element 60. That is, in the wiring pattern PS3, the amount of current equivalent to the sum of the amount of current of the currents flowing through each of the wiring patterns PA1, PB1, and PC1 flows in the direction opposite to the current flowing through the wiring patterns PA1, PB1, and PC1. In this case, as illustrated in FIG. 16, at least a part of the wiring pattern PS3 is located so as to overlap with the wiring patterns PA1, PB1, and PC1 in the Z3 direction, so that the magnetic field generated by the current flowing through the wiring patterns PA1, PB1 and PC1 and the magnetic field generated by the current flowing through the wiring pattern PS3 cancel each other out. As a result, the inductance component generated by the current generated when the wiring member 30 propagates through the drive signals COMA1, COMB1, and COMC1 is reduced.

The inductance component caused by the current generated when the wiring member 30 propagates through the drive signals COMA1, COMB1, and COMC1 is reduced. Therefore, the possibility of waveform distortion generated in the drive signals COMA1, COMB1, and COMC1 is reduced, the waveform accuracy of the drive signals COMA1, COMB1, and COMC1 is improved, and the waveform accuracy of the drive signal VOUT generated based on the drive signals COMA1, COMB1, and COMC1 is improved. As a result, the discharge accuracy of the ink is improved.

Here, as illustrated in FIG. 16, it is preferable that at least a part of the wiring pattern PS3 is located so as to overlap with all of the wiring patterns PA1, PB1, and PC1 in the direction along the Z3 direction, but the present disclosure is not limited thereto. When at least a part of the wiring pattern PS3 and at least a part of the wiring patterns PA1, PB1, and PC1 are located so as to overlap with each other, the inductance component generated when the drive signals COMA1, COMB1, and COMC1 are propagated can be reduced.

In addition, as illustrated in FIG. 16, from the viewpoint of reducing the inductance component caused by the current generated when the drive signals COMA1, COMB1, and COMC1 propagate through the wiring member 30, it is preferable that the width wa of the wiring pattern PA1 is made wider than the thickness ta, the width wb of the wiring pattern PB1 is made wider than the thickness ta, the width we of the wiring pattern PC1 is made wider than the thickness ta, and the width ws of the wiring pattern PS3 is made wider than the thickness ts. As a result, it is possible to increase the area where the wiring patterns PA1, PB1, and PC1 and the wiring pattern PS3 face each other via the base material 700. As a result, the canceling efficiency between the magnetic field generated by the current flowing through each of the wiring patterns PA1, PB1, and PC1 and the magnetic field generated by the current flowing through the wiring pattern PS3 is improved.
The inductance component caused by the current generated when the wiring member 30 propagates through the drive signals COMA1, COMB1, and COMC1 can be further reduced. As a result, the possibility of waveform distortion generated in the drive signals COMA1, COMB1, and COMC1 is further reduced.

Here, the wiring member 30 is an example of a coupling member. In addition, one of the drive signals COMA1 and COMB1 that drives the piezoelectric element 60 so that the ink is discharged is an example of a first drive signal. The other of the drive signals COMA1 and COMB1 that drives the piezoelectric element 60 so that the ink is discharged is an example of a third drive signal. The drive signal COMC1 that drives the piezoelectric element 60 so that the ink is not discharged is an example of a second drive signal. The wiring pattern PA1 or the wiring pattern PB1 propagated by one of the drive signals COMA1 and COMB1 corresponding to the first drive signal is an example of a first wiring. The wiring pattern PA1 or the wiring pattern PB1 propagated by the other of the drive signals COMA1 and COMB1 corresponding to the third drive signal is an example of a fourth wiring. The wiring pattern PC1 propagated by the drive signal COMC1 corresponding to the second drive signal is an example of a second wiring. The wiring pattern PS3 that propagates the reference voltage signal VBS1 is an example of a third wiring. In addition, the surface 705 of the base material 700 is an example of a first surface, and the surface 706 is an example of a second surface. The Z3 direction along the direction from the surface 705 to the surface 706 is an example of the first direction. The X3 direction along the direction from the side 701 as one end to the side 702 as the other end along the wiring member 30 is an example of the second direction. The Y3 direction which is the direction where the wiring patterns PA1, PB1, and PC1 are arranged, and intersects both the Z3 direction and the X3 direction is an example of the third direction.

1.6 Action and Effect

In the liquid discharge device 1, when propagating the drive signal COMA1 that drives the piezoelectric element 60 so as to discharge ink from the head drive module 10 to the liquid discharge module 20, the drive signal COMC1 that drives the piezoelectric element 60 so as not to discharge ink, and the reference voltage signal VBS1 that is the reference potential for driving the piezoelectric element 60, in a case in which a flexible flat cable (FFC) as described in JP-A-2019-005961 is used, from the viewpoint of further increasing the ink discharge rate in the liquid discharge device 1, when the amount of current generated by the drive signal COMA1 that drives the piezoelectric element 60 to discharge ink increases, it is necessary to increase the number of wirings propagating the drive signal COMA. As the number of wirings propagating the drive signal COMA increases, the number of wirings propagating the reference voltage signal VBS also increases from the viewpoint of reducing the inductance component. As a result, the area occupied by the wiring member 30 in the liquid discharge device 1 increases, and the size of the liquid discharge device 1 increases.

In response to such a problem, in the liquid discharge device 1 of the present embodiment, the wiring pattern PA1 that propagates the drive signal COMA1 driving the piezoelectric element 60 so as to discharge ink, the wiring pattern PC1 that propagates the drive signal COMC1 driving the piezoelectric element 60 so as not to discharge ink, and the wiring patterns PS1, PS2, and PS3 that propagate the reference voltage signal VBS1 serving as the reference potential for driving the piezoelectric element 60 are provided in one wiring member 30. The wiring patterns PA1 and PC1 are provided on the surface 705 of the base material 700 of the wiring member 30, and the wiring pattern PC3 is provided on the surface 706 of the base material 700 of the wiring member 30. That is, in the liquid discharge device 1 of the present embodiment, the wiring member 30 is a wiring substrate in which the wiring patterns PA1 and PC1 and the wiring pattern PC3 are provided on the base material 700, and is configured to include, for example, an FPC. As a result, it is possible to randomly change the cross-sectional area of the wiring propagated by each of the drive signal COMA1 driving the piezoelectric element 60 so as to discharge ink, the drive signal COMC1 driving the piezoelectric element 60 so as not to discharge ink, and the reference voltage signal VBS1 serving as the reference potential for driving the piezoelectric element 60. As a result, even when the amount of current generated by the drive signal COMA1 that drives the piezoelectric element 60 to discharge ink increases, it is possible to form wiring having an optimum current density in the wiring member 30. That is, it is possible to reduce the possibility that the number of wirings of the wiring member 30 increases as the amount of current generated when propagating the drive signal COMA increases. As a result, the possibility that the area occupied by the wiring member 30 in the liquid discharge device 1 increases can be reduced, and the possibility that the size of the liquid discharge device 1 increases can be reduced.

In addition, the wiring patterns PA1 and PC1 provided on the surface 705 of the base material 700 included in the wiring member 30 are provided so that at least a part of the wiring pattern PC3 and the wiring pattern PS3 provided on the surface 706 of the base material 700 included in the wiring member 30 overlap with each other in the normal direction of the base material 700 from the surface 705 to the surface 706. Therefore, it is possible to reduce the inductance component caused by the current generated when the drive signal COMA1 is propagated. As a result, the possibility that the overshoot voltage caused by the inductance component is superimposed on the drive signal COMA is reduced. That is, the waveform accuracy of the drive signal COMA1 supplied to the liquid discharge module 20 is improved, and as a result, the discharge accuracy of the ink of the liquid discharge module 20 is also improved.

Furthermore, since the wiring patterns PA1 and PC1 are provided on the surface 705 of the base material 700 of the wiring member 30, and the wiring pattern PC3 is provided on the surface 706 of the same base material 700, even when the wiring member 30 is curved and deformed, the relative positional relationship between the wiring patterns PA1 and PC1 and the wiring pattern PC3 can be kept substantially constant. As a result, even when the wiring member 30 is curved and deformed, it is possible to keep the canceling relationship between the magnetic field generated by the current flowing through the wiring patterns PA1 and PC1 and the magnetic field generated by the current flowing through the wiring pattern PC3 constant. Even when the wiring member 30 is curved and deformed, the possibility that the efficiency of reducing the inductance component due to the current generated when the drive signal COMA1 is propagated is decreased is reduced. That is, even when the wiring member 30 is curved and deformed, the possibility that the waveform accuracy of the drive signal COMA1 supplied to the liquid discharge module 20 is decreased is reduced, and the discharge accuracy of the ink of the liquid discharge module 20 is improved.

1.7 Modification Example

In the liquid discharge device 1 in the present embodiment described above, although it is described that the wiring groups WG1 to WG6 included in the wiring member 30 differ only in the propagating signals, and all of the wiring groups have the same configuration, in each of the wiring groups WG1 to WG6 included in the wiring member 30, the wiring pattern PA1 that propagates the drive signal COMA, the wiring pattern PB1 that propagates the drive signal COMB, the wiring pattern PC1 that propagates the drive signal COMC, and the wiring pattern PS3 that propagates the reference voltage signal VBS1 serving as the reference potential for driving the piezoelectric element 60 may include the base material 700 provided with the wiring patterns PA1, PB1, PC1, PS1, PS2, and PS3. In each of the wiring groups WG1 to WG6 included in the wiring member 30, the wiring pattern PA1 that propagates the drive signal COMA, the wiring pattern PB1 that propagates the drive signal COMB, and the wiring pattern PC1 that propagates the drive signal COMC may be provided on one surface of the base material 700, and the wiring pattern PS3 may be provided on the other surface of the base material 700. In this case, when each of the wiring groups WG1 to WG6 included in the wiring member 30 is viewed from the Z3 direction, at least one of the wiring pattern PA1 and the wiring pattern PC1 and at least a part of the wiring pattern PS3 may be overlapped with each other.

Figure 17:
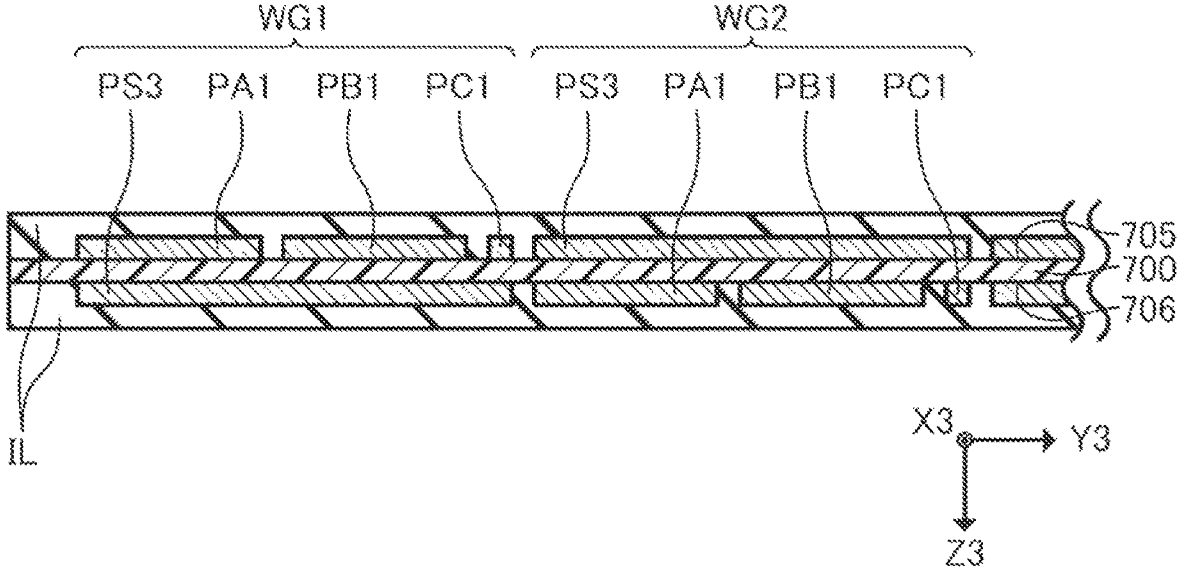
FIG. 17 is a cross-sectional view of a wiring member in a modification example.

An example of a configuration of a wiring member 30 in a modification example will be described with reference to FIG. 17. FIG. 17 is a cross-sectional view of the wiring member 30 in the modification example. As illustrated in FIG. 17, the wiring pattern PA1 that propagates the drive signal COMA1 in the wiring group WG1, the wiring pattern PB1 that propagates the drive signal COMB1, and the wiring pattern PC1 that propagates the drive signal COMC1 are provided on the surface 705 of the base material 700, and the wiring pattern PS3 is provided on the surface 706 different from the surface 705 of the base material 700. On the other hand, in the wiring group WG2, the wiring pattern PA1 that propagates the drive signal COMA2, the wiring pattern PB1 that propagates the drive signal COMB2, and the wiring pattern PC1 that propagates the drive signal COMC2 are provided on the surface 706 of the base material 700, and the wiring pattern PS3 is provided on a surface 705 different from the surface 706 of the base material 700. Even with the wiring member 30 having such a configuration, the same action and effect can be obtained.

2. Second Embodiment

Next, a liquid discharge device 1 of a second embodiment will be described. In describing the liquid discharge device 1 of the second embodiment, the same reference numerals are given to the same configurations as those of the liquid discharge device 1 of the first embodiment, and the description thereof will be simplified or omitted.

The liquid discharge device 1 of the second embodiment is different from the liquid discharge device 1 of the first embodiment in that the wiring through which the drive signal COMA1 propagates and the wiring through which the drive signal COMB1 propagates are provided on different surfaces of the base material 700, the wiring through which the drive signal COMA1 propagates and the wiring through which the reference voltage signal VBS propagates are located so as to face each other along the Z3 direction, and the wiring through which the drive signal COMB1 propagates and the wiring through which the reference voltage signal VBS propagates are located so as to face each other along the Z3 direction in the wiring member 30.

Figure 18:
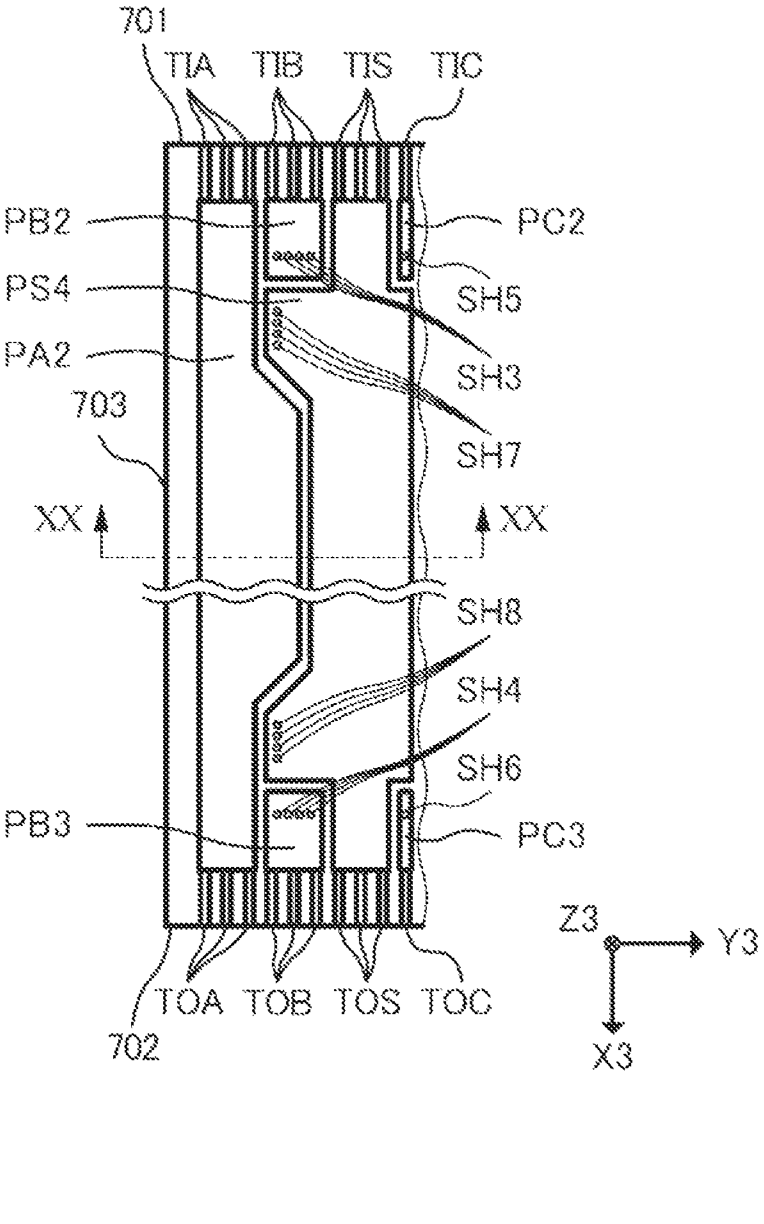
FIG. 18 is a diagram illustrating an example of wiring provided on a surface of a base material in a second embodiment.
Figure 19:
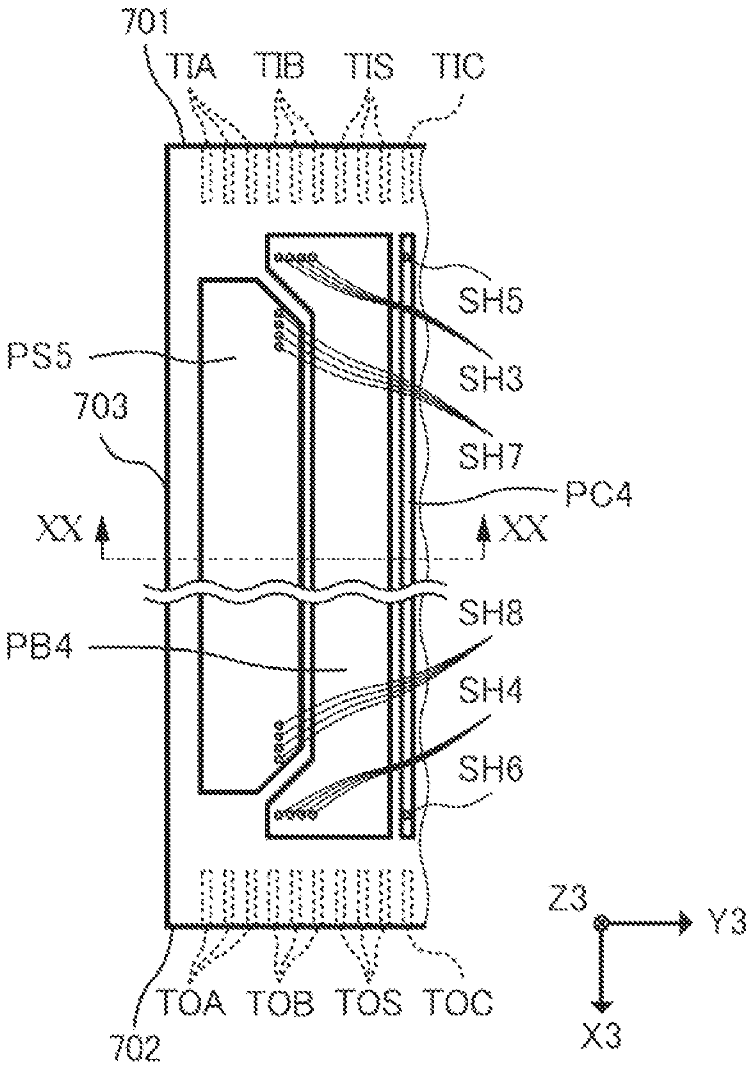
FIG. 19 is a diagram illustrating an example of wiring provided on the surface of the base material in the second embodiment.

FIG. 18 is a diagram illustrating an example of wiring provided on the surface 705 of the base material 700 in the wiring group WG1 included in the wiring member 30 in the second embodiment. FIG. 19 is a diagram illustrating an example of wiring provided on the surface 706 of the base material 700 in the wiring group WG1 included in the wiring member 30 in the second embodiment. FIGS. 18 and 19 illustrate the same X3 direction, Y3 direction, and Z3 direction as those in the first embodiment. Here, FIGS. 18 and 19 are diagrams of the wiring member 30 viewed from the +Z3 side toward the −Z3 side. That is, FIG. 18 is a plan view illustrating an example of the configuration of the surface 705 of the base material 700 in the wiring group WG1, and FIG. 19 is a perspective view illustrating an example of the configuration of the surface 706 of the base material 700 in the wiring group WG1. In addition, in FIG. 19, a part of the configuration provided on the surface 705 is illustrated by a broken line.

As illustrated in FIGS. 18 and 19, the wiring group WG1 includes terminals TIA, TIB, TIC, and TIS, terminals TOA, TOB, TOC, and TOS, wiring patterns PA2, PB2, PB3, PB4, PC2, PC3, PC4, PS4, and PS5, and through-holes SH3, SH4, SH5, SH6, SH7, and SH8.

Similar to the first embodiment, the terminals TIA, TIB, TIC, and TIS are located side by side in the order of terminals TIA, TIB, TIS, and TIC along the side 701 on the surface 705 of the base material 700. When the wiring member 30 is attached to the coupling portion CN2, each of the terminals TIA, TIB, TIC, and TIS comes into contact with the electrodes (not illustrated) of the coupling portion CN2. As a result, the wiring member 30 and the coupling portion CN2 are electrically coupled to each other. In addition, the terminals TOA, TOB, TOC, and TOS are located side by side in the order of the terminals TOA, TOB, TOS, and TOC along the side 702 on the surface 705 of the base material 700, similar to the first embodiment. When the wiring member 30 is attached to the coupling portion 330, each of the terminals TOA, TOB, TOC, and TOS comes into contact with the electrodes (not illustrated) of the coupling portion 330. As a result, the wiring member 30 and the coupling portion 330 are electrically coupled to each other.

The wiring pattern PA2 is provided on the surface 705 and electrically couples the three terminals TIA and the three terminals TOA. As a result, the signal input from the head drive module 10 to the three terminals TIA via the coupling portion CN2 propagates through the wiring pattern PA2, and is supplied to the coupling portion 330 of the liquid discharge module 20 via the three terminals TOA.

The wiring pattern PB2 is located on the +Y3 side of the wiring pattern PA2 on the surface 705, and electrically couples the three terminals TIB and the through-hole SH3. The through-hole SH3 penetrates the base material 700 along the Z3 direction, and electrically couples the wiring pattern PB2 provided on the surface 705 and the wiring pattern PB4 provided on the surface 706. The wiring pattern PB4 electrically couples the through-hole SH3 and the through-hole SH4 on the surface 706. The through-hole SH4 penetrates the base material 700 along the Z3 direction, and electrically couples the wiring pattern PB4 provided on the surface 706 and the wiring pattern PB3 provided on the surface 705. The wiring pattern PB3 is located on the +Y3 side of the wiring pattern PA2 on the surface 705, and electrically couples the three terminals TOB and the through-hole SH4. As a result, the signal input from the head drive module 10 to the three terminals TIB via the coupling portion CN2 propagates through the wiring pattern PB2, the through-hole SH3, the wiring pattern PB4, the through-hole SH4, and the wiring pattern PB3, and is supplied to the coupling portion 330 of the liquid discharge module 20 via the three terminals TOB.

The wiring pattern PC2 is located on the +Y3 side of the wiring pattern PB2 on the surface 705, and electrically couples one terminal TIC and the through-hole SH5. The through-hole SH5 penetrates the base material 700 along the Z3 direction, and electrically couples the wiring pattern PC2 provided on the surface 705 and the wiring pattern PC4 provided on the surface 706. The wiring pattern PC4 electrically couples the through-hole SH5 and the through-hole SH6 on the surface 706. The through-hole SH6 penetrates the base material 700 along the Z3 direction, and electrically couples the wiring pattern PC4 provided on the surface 706 and the wiring pattern PC3 provided on the surface 705. The wiring pattern PC3 is located on the +Y3 side of the wiring pattern PB2 on the surface 705, and electrically couples one terminal TOC and the through-hole SH6. As a result, the signal input from the head drive module 10 to the three terminals TICs via the coupling portion CN2 propagates through the wiring pattern PC2, the through-hole SH5, the wiring pattern PC4, the through-hole SH6, and the wiring pattern PC3, and is supplied to the coupling portion 330 of the liquid discharge module 20 via one terminal TOC.

A part of the wiring pattern PS4 is located between the wiring pattern PB2 and the wiring pattern PC2, and a different part is located between the wiring pattern PB3 and the wiring pattern PC3 on the +Y3 side of the wiring pattern PA2 on the surface 705. The wiring pattern PS4 electrically couples the three terminals TIS and the three terminals TOS. In addition, the wiring pattern PS4 is also electrically coupled to the through-holes SH7 and SH8. The through-hole SH7 penetrates the base material 700 along the Z3 direction, and electrically couples the wiring pattern PS4 provided on the surface 705 and the wiring pattern PS5 provided on the surface 706. The through-hole SH8 is located on the +X3 side of the through-hole SH7 and penetrates the base material 700 along the Z3 direction. As a result, the through-hole SH8 electrically couples the wiring pattern PS4 provided on the surface 705 and the wiring pattern PS5 provided on the surface 706. As a result, the signal input from the head drive module 10 to the three terminals TIS via the coupling portion CN2 propagates through the wiring pattern PS4, is supplied to the coupling portion 330 of the liquid discharge module 20 via the three terminals TOS, propagates through the wiring pattern PS5 provided in parallel with the wiring pattern PS4 by the through-holes SH7 and SH8, and is supplied to the coupling portion 330 of the liquid discharge module 20 via the three terminals TOS.

Similar to the liquid discharge device 1 of the first embodiment, the drive signal COMA1 output by the head drive module 10 is input to the terminal TIA, the drive signal COMB1 is input to the terminal TIB, the drive signal COMC1 is input to the terminal TIC, and the reference voltage signal VBS1 is input to the terminal TIS in the wiring member 30 of the second embodiment configured as described above.

The drive signal COMA1 input to the terminal TIA propagates through the wiring pattern PA2 and is supplied to the liquid discharge module 20 via the terminal TOA. The drive signal COMB1 input to the terminal TIB propagates through the wiring patterns PB2, PB3, and PB4, and is supplied to the liquid discharge module 20 via the terminal TOB. The drive signal COMC1 input to the terminal TIC propagates through the wiring patterns PC2, PC3, and PC4, and is supplied to the liquid discharge module 20 via the terminal TOC. The reference voltage signal VBS1 input to the terminal TIS is branched by the through-hole SH7 in the wiring pattern PS4. One of the branched reference voltage signals VBS1 propagates through the wiring pattern PS4 and is supplied to the liquid discharge module 20 via the terminal TOS, and the other branched reference voltage signal VBS1 propagates through the wiring pattern PS5 via the through-hole SH7 and joins the wiring pattern PS4 via the through-hole SH8. That is, the reference voltage signal VBS1 input to the terminal TIS propagates through the wiring pattern PS4 and the wiring pattern PS5 provided in parallel with the wiring pattern PS4, and is supplied to the liquid discharge module 20 via the terminal TOS.

That is, the wiring member 30 in the second embodiment includes the wiring pattern PA2 that propagates the drive signal COMA1, the wiring patterns PB2 to PB4 that propagate the drive signal COMB1, the wiring patterns PC2 to PC4 that propagate the drive signal COMC1, the wiring patterns PS4 and PS5 that propagate the reference voltage signal VBS1 serving as the reference potential for driving the piezoelectric element 60, and the base material 700 provided with the wiring patterns PA2, PB2 to PB4, PC2 to PC4, PS4, and PS5. The wiring patterns PA2, PB2, PB3, PC2, PC3, and PS4 are provided on the surface 705 of the base material 700, and the wiring patterns PB4 and PS5 are provided on the surface 706 different from the surface 705 of the base material 700.

In the wiring member 30 configured as described above, when the base material 700 is viewed from the Z3 direction, the wiring pattern PA2 provided on the surface 705 is located so that at least a part of the wiring pattern PA2 overlaps with the wiring pattern PS5 provided on the surface 706. The wiring pattern PB4 provided on the surface 706 is located so that at least a part of the wiring pattern PB4 overlaps with the wiring pattern PS4 provided on the surface 705.

Figure 20:
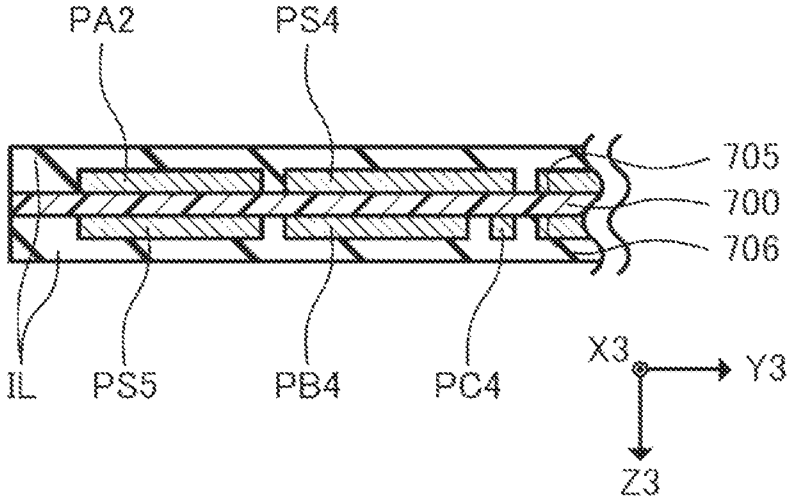
FIG. 20 is a cross-sectional view when the wiring member is cut along the line XX-XX illustrated in FIGS. 18 and 19.

A specific example of the configuration of the wiring member 30 will be described with reference to FIG. 20. FIG. 20 is a cross-sectional view when the wiring member 30 is cut along the line XX-XX illustrated in FIGS. 18 and 19. As illustrated in FIG. 20, at least a part of the wiring pattern PA2 provided on the surface 705 of the base material 700 and propagating the drive signal COMA1 is located so as to overlap with the wiring pattern PS5 provided on the surface 706 of the base material 700 and propagating the reference voltage signal VBS1 in the direction along the Z3 direction. At least a part of the wiring pattern PB4 provided on the surface 706 of the base material 700 and propagating the drive signal COMB1 and the wiring pattern PC4 propagating the drive signal COMC1 is located so as to overlap with the wiring pattern PS5 provided on the surface 706 of the base material 700 and propagating the reference voltage signal VBS1 along the Z3 direction.

Even the liquid discharge device 1 of the second embodiment configured as described above can exhibit the same action and effect as those of the liquid discharge device 1 of the first embodiment.

Here, the drive signal COMB1 that drives the piezoelectric element 60 so that the ink is discharged is an example of a first drive signal in the second embodiment. The drive signal COMA1 that drives the piezoelectric element 60 so that the ink is discharged is an example of a third drive signal in the second embodiment. The drive signal COMC1 that drives the piezoelectric element 60 so that the ink is not discharged is an example of a second drive signal in the second embodiment. The wiring pattern PB4 in which the drive signal COMB1 corresponding to the first drive signal propagates is an example of the first wiring in the second embodiment. The wiring pattern PA2 in which the drive signal COMA1 corresponding to the third drive signal propagates is an example of the fourth wiring in the second embodiment. The wiring pattern PC4 in which the drive signal COMC1 corresponding to the second drive signal propagates is an example of the second wiring in the second embodiment. The wiring pattern PS4 that propagates the reference voltage signal VBS1 is an example of the third wiring in the second embodiment.

Although the embodiments and the modification example have been described above, the present disclosure is not limited to these embodiments, and can be implemented in various aspects without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to an aspect of the present disclosure, there is provided a liquid discharge device including a discharge head that discharges liquid in response to a drive of a drive element, a head drive circuit that outputs a first drive signal driving the drive element so that the liquid is discharged, and a second drive signal driving the drive element so that the liquid is not discharged, and a coupling member whose one end is electrically coupled to the head drive circuit and the other end is electrically coupled to the discharge head, in which the coupling member includes a first wiring that propagates the first drive signal, a second wiring that propagates the second drive signal, a third wiring that propagates a reference voltage signal serving as a reference potential for driving the drive element, and a base material provided with the first wiring, the second wiring, and the third wiring, the first wiring and the second wiring are provided on a first surface of the base material, the third wiring is provided on a second surface different from the first surface of the base material, and at least one of the first wiring and the second wiring is located so as to overlap with at least a part of the third wiring in a first direction along a direction from the first surface to the second surface.

According to the liquid discharge device, by using the wiring substrate provided on the base material for the first wiring that propagates the first drive signal, the second wiring that propagates the second drive signal, and the third wiring that propagates the reference voltage signal as the coupling member, the effective cross-sectional area of the first wiring, the second wiring, and the third wiring can be set to the optimum state in response to the amount of current flowing through the first wiring, the second wiring, and the third wiring. As a result, even when the liquid discharge rate is further increased, the possibility that the first wiring, the second wiring, and the third wiring included in the coupling member increase is reduced. Therefore, the possibility that the area occupied by the coupling member in the liquid discharge device increases is reduced. As a result, the possibility that the size of the liquid discharge device increases is reduced.

In addition, according to this liquid discharge device, at least one of the first wiring and the second wiring is located so as to overlap with at least a part of the third wiring in the first direction along the direction from the first surface to the second surface of the base material. Therefore, the magnetic field generated by the current generated when the first drive signal or the second drive signal propagates through the coupling member is canceled out. As a result, the possibility that the overshoot voltage is superimposed on the first drive signal or the second drive signal is reduced, the drive accuracy of the drive element by the first drive signal or the second drive signal is improved, and the discharge accuracy of the liquid from the discharge head is improved.

Furthermore, according to the liquid discharge device, the first wiring that propagates the first drive signal, the second wiring that propagates the second drive signal, and the third wiring that propagates the reference voltage signal are provided on one base material as the coupling member. Therefore, even when the coupling member is curved or bent, the relative positional relationship between the first wiring and the second drive signal and the third wiring in the coupling member is maintained. As a result, even when the coupling member is curved or bent, the inductance component generated by the current generated when the first drive signal and the second drive signal propagate is reduced.

In an aspect of the liquid discharge device, the first wiring and the second wiring may be located side by side along a third direction that intersects both the first direction and a second direction from the one end to the other end along the coupling member.

According to the liquid discharge device, it is possible to more efficiently cancel the magnetic field generated by the current generated when the first drive signal or the second drive signal propagates through the coupling member. Therefore, the possibility that the overshoot voltage is superimposed on the first drive signal or the second drive signal is further reduced, the drive accuracy of the drive element by the first drive signal or the second drive signal is further improved, and the discharge accuracy of the liquid from the discharge head is further improved.

In an aspect of the liquid discharge device, a length of the third wiring in the third direction may be longer than a length of the first wiring in the third direction.

According to the liquid discharge device, it is possible to more efficiently cancel the magnetic field generated by the current generated when the first drive signal or the second drive signal propagates through the coupling member. Therefore, the possibility that the overshoot voltage is superimposed on the first drive signal or the second drive signal is further reduced, the drive accuracy of the drive element by the first drive signal or the second drive signal is further improved, and the discharge accuracy of the liquid from the discharge head is further improved.

In an aspect of the liquid discharge device, a length of the first wiring in the third direction may be longer than a length of the first wiring in the first direction, and a length of the third wiring in the third direction may be longer than a length of the third wiring in the first direction.

According to the liquid discharge device, it is possible to more efficiently cancel the magnetic field generated by the current generated when the first drive signal or the second drive signal propagates through the coupling member. Therefore, the possibility that the overshoot voltage is superimposed on the first drive signal or the second drive signal is further reduced, the drive accuracy of the drive element by the first drive signal or the second drive signal is further improved, and the discharge accuracy of the liquid from the discharge head is further improved.

In an aspect of the liquid discharge device, the head drive circuit may output a third drive signal driving the drive element so that the liquid is discharged, and the coupling member may include a fourth wiring that propagates the third drive signal.

According to the liquid discharge device, the head drive circuit outputs the third drive signal that drives the drive element so that the liquid is discharged, in addition to the first drive signal that drives the drive element so that the liquid is discharged, so that the drive of the drive element can be finely controlled.

In an aspect of the liquid discharge device, an amount of liquid discharged from the discharge head when the third drive signal is supplied to the drive element may be different from an amount of liquid discharged from the discharge head when the first drive signal is supplied to the drive element.

According to the liquid discharge device, it is possible to finely control the discharge amount of the liquid when the first drive signal and the third drive signal output by the head drive circuit are supplied to the drive element. As a result, the discharge amount of the liquid discharged by driving the drive element can be finely controlled.

In an aspect of the liquid discharge device, the fourth wiring may be provided on the first surface.

In an aspect of the liquid discharge device, the fourth wiring may be provided on the second surface.

In an aspect of the liquid discharge device, the coupling member may include an insulating layer that insulates the first wiring, the second wiring, and the third wiring.

What is claimed is:

1. A liquid discharge device comprising:

a discharge head that discharges liquid in response to a drive of a drive element;

a head drive circuit that outputs a first drive signal driving the drive element so that the liquid is discharged, and a second drive signal driving the drive element so that the liquid is not discharged; and a coupling member whose one end is electrically coupled to the head drive circuit and the other end is electrically coupled to the discharge head, wherein the coupling member includes a first wiring that propagates the first drive signal, a second wiring that propagates the second drive signal, a third wiring that propagates a reference voltage signal serving as a reference potential for driving the drive element, and a base material provided with the first wiring, the second wiring, and the third wiring, the first wiring and the second wiring are provided on a first surface of the base material, the third wiring is provided on a second surface different from the first surface of the base material, at least one of the first wiring and the second wiring is located so as to overlap with at least a part of the third wiring in a first direction along a direction from the first surface to the second surface, and the coupling member includes an insulating layer that insulates the first wiring, the second wiring, and the third wiring.

2. The liquid discharge device according to claim 1, wherein the first wiring and the second wiring are located side by side along a third direction that intersects both the first direction and a second direction from the one end to the other end along the coupling member.

3. The liquid discharge device according to claim 2, wherein a length of the third wiring in the third direction is longer than a length of the first wiring in the third direction.

4. The liquid discharge device according to claim 2, wherein a length of the first wiring in the third direction is longer than a length of the first wiring in the first direction, and a length of the third wiring in the third direction is longer than a length of the third wiring in the first direction.

5. The liquid discharge device according to claim 1, wherein the head drive circuit outputs a third drive signal driving the drive element so that the liquid is discharged, and the coupling member includes a fourth wiring that propagates the third drive signal.

6. The liquid discharge device according to claim 5, wherein an amount of liquid discharged from the discharge head when the third drive signal is supplied to the drive element is different from an amount of liquid discharged from the discharge head when the first drive signal is supplied to the drive element.

7. The liquid discharge device according to claim 5, wherein the fourth wiring is provided on the first surface.

8. The liquid discharge device according to claim 5, wherein the fourth wiring is provided on the second surface.

* * * * *